US008687678B2

(12) United States Patent
Hammarwall et al.

(10) Patent No.: US 8,687,678 B2
(45) Date of Patent: Apr. 1, 2014

(54) PARAMETERIZED CODEBOOK WITH SUBSET RESTRICTIONS FOR USE WITH PRECODING MIMO TRANSMISSIONS

(71) Applicant: Telefonaktiebolaget L M Ericsson (publ), Stockholm (SE)

(72) Inventors: David Hammarwall, Stockholm (SE); George Jöngren, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/903,442

(22) Filed: May 28, 2013

(65) Prior Publication Data
US 2013/0272351 A1 Oct. 17, 2013

Related U.S. Application Data

(63) Continuation of application No. 13/080,740, filed on Apr. 6, 2011, now Pat. No. 8,472,547.

(60) Provisional application No. 61/321,679, filed on Apr. 7, 2010.

(51) Int. Cl.
*H04B 1/38* (2006.01)
*H04L 5/16* (2006.01)

(52) U.S. Cl.
USPC ........... 375/219; 375/259; 375/260; 375/261; 375/267

(58) Field of Classification Search
USPC ................................. 375/219, 267
See application file for complete search history.

(56) References Cited

U.S. PATENT DOCUMENTS

| 8,199,836 | B2 * | 6/2012 | Khojastepour et al. | ........ 375/260 |
| 2011/0122968 | A1 * | 5/2011 | Jongren et al. | ................ 375/296 |
| 2011/0249637 | A1 * | 10/2011 | Hammarwall et al. | ........ 370/329 |
| 2011/0249712 | A1 * | 10/2011 | Hammarwall et al. | ........ 375/220 |
| 2012/0224649 | A1 * | 9/2012 | Khojastepour et al. | ........ 375/260 |

FOREIGN PATENT DOCUMENTS

WO    2009/025619 A2    2/2009

OTHER PUBLICATIONS

3RD Generation Partnership Project. "Further Refinements of Feedback Framework." 3GPP TSG-RAN WG1 #60bis, R1-101742, Beijing, China, Apr. 12-16, 2010.
3RD Generation Partnership Project. "Possible Refinement on 8Tx Codebook Design." 3GPP TSG RAN WG1 60bis, R1-102104, Beijing, China, Apr. 12-16, 2010.

(Continued)

*Primary Examiner* — Erin File
(74) *Attorney, Agent, or Firm* — Coats and Bennett, P.L.L.C.

(57) ABSTRACT

One aspect of the teachings herein relates to signaling codebook restrictions, to restrict the precoder recommendations being fed back from a remote transceiver, so that precoder selections made by the remote receiver are restricted to permitted subsets of overall precoders within a defined set of overall precoders, or to permitted subsets within larger sets of conversion precoders and tuning precoders, for the case where the overall precoders are represented in factorized form by conversion and tuning precoders. As a non-limiting example, these teachings advantageously provide for precoder restrictions in LTE or LTE-Advanced networks, where ongoing development targets the use of larger, richer sets of precoders, and where the disclosed mechanisms for determining, signaling, and responding to subset restrictions provide significant operational advantages.

29 Claims, 6 Drawing Sheets

(56) References Cited

OTHER PUBLICATIONS

3RD Generation Partnership Project. "CQI and MIMO Feedback for LTE." 3GPP TSG RAN WG1 #50-bis Meeting, R1-074356, Shanghai, China, Oct. 8-12, 2007.

3RD Generation Partnership Project. "Persistent CQI/PMI/Rank Reporting on PUCCH/PUSCH." 3GPP TSG RAN WG1 Meeting #52, R1-080765, Sorrento, Italy, Feb. 11-15, 2008.

3RD Generation Partnership Project. "Multiple Granularity Feedback Design for LTE-A." 3GPP TSG-RAN WG1 #60, R1-101399, San Fransicso, CA, USA, Feb. 22-26, 2010.

3RD Generation Partnership Project. "Precoding Codebook Design for 4 Node-B Antenna." 3GPP TSG RAN WG1 48bis, R1-071798, St. Julian's, Malta, Mar. 26-30, 2007.

3RD Generation Partnership Project. "Configuration of Feedback Mode for MIMO Transmission." 3GPP TSG RAN WG1 Meeting #60, R1-101287, San Francisco, CA, USA, Feb. 22-26, 2010.

3RD Generation Partnership Project. "Way Forward for MU-MIMO Design." 3GPP TSG RAN WG1 Meeting #49bis, R1-073100, Orlando, FL, USA, Jun. 25-29, 2007.

3RD Generation Partnership Project. "PMI-Based Multi-Granular Feedback for SU/MU-MIMO Operation." 3GPP TSG-RAN WG1 #60, R1-100852, San Francisco,CA, USA, Feb. 22-26, 2010.

* cited by examiner

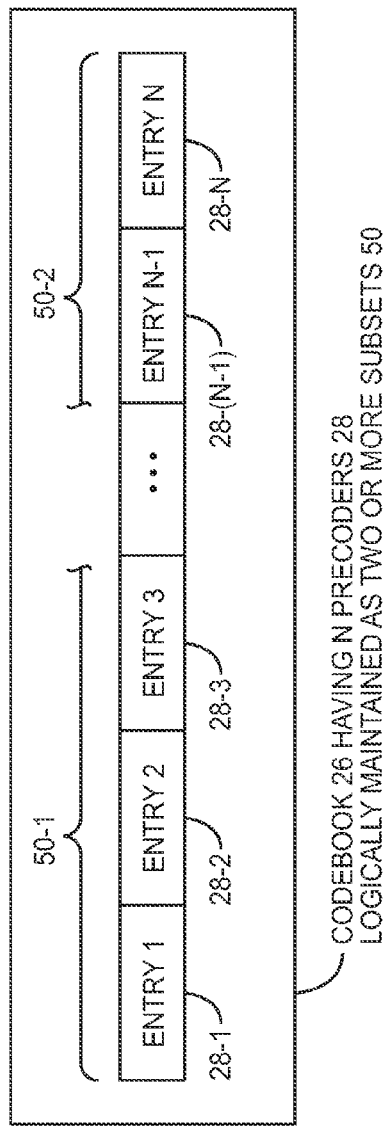
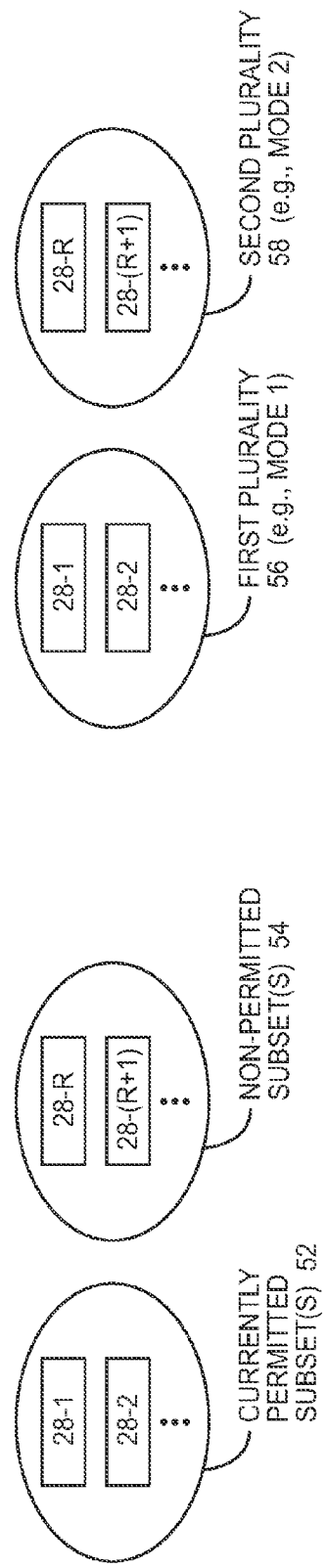
FIG. 2
FIG. 3
FIG. 4

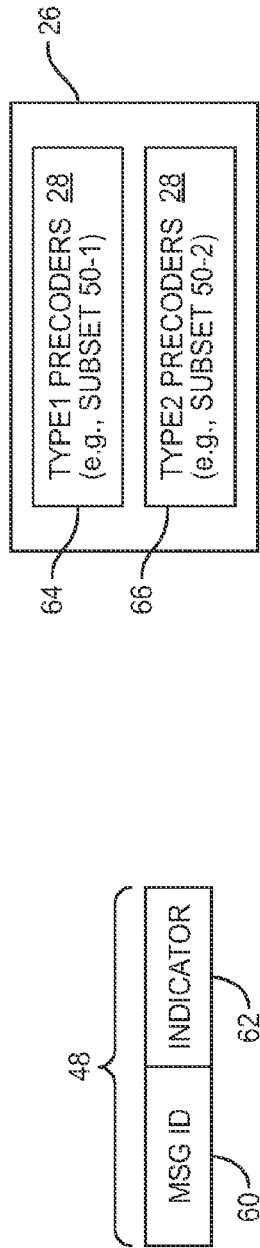
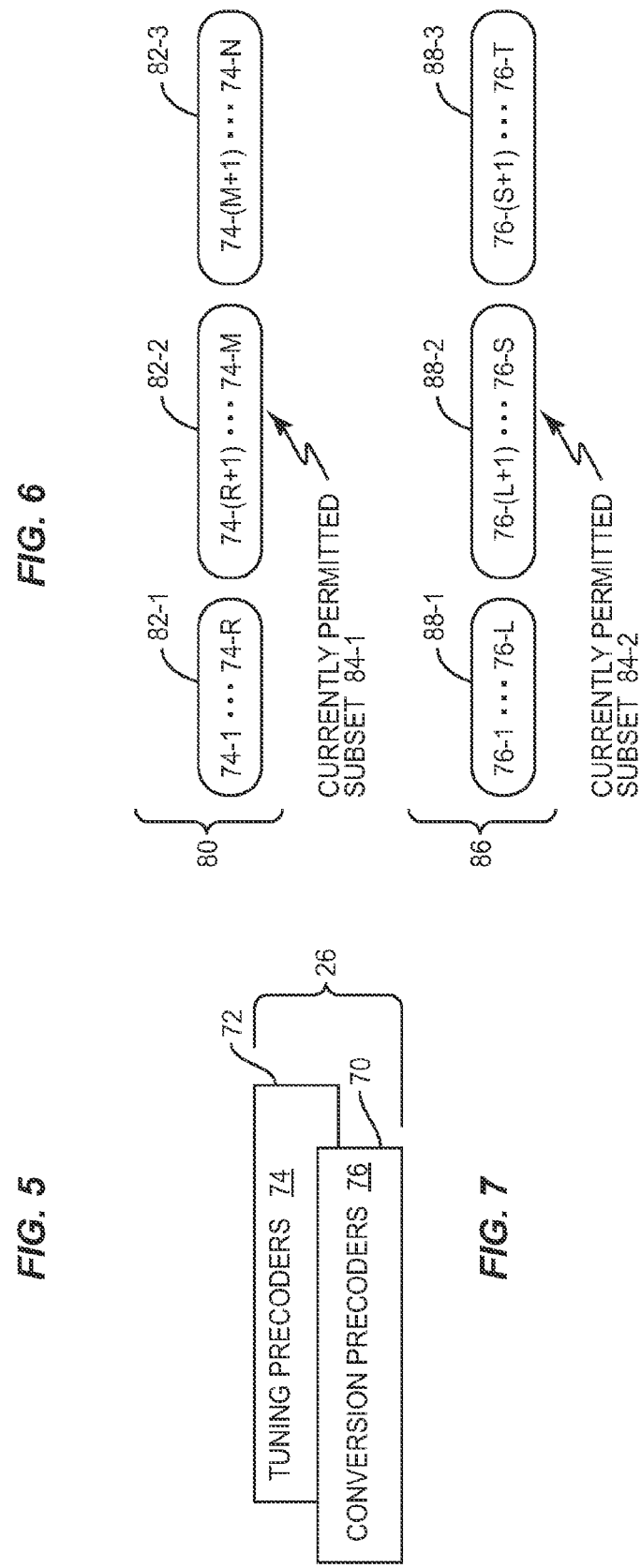
FIG. 5
FIG. 6
FIG. 7
FIG. 8

PARAMETERIZED CODEBOOK WITH SUBSET RESTRICTIONS FOR USE WITH PRECODING MIMO TRANSMISSIONS

RELATED APPLICATIONS

The present application is a continuation of U.S. patent application Ser. No. 13/080,740, which was filed on Apr. 6, 2011, which claims benefit of U.S. Provisional Patent Application No. 61/321,679, filed on 7 Apr. 2010, which are incorporated herein by reference.

FIELD OF THE INVENTION

The teachings herein generally relate to codebooks and precoding, and particularly relate to the use of parameterized codebook subsets, such as may be used to restrict codebook selections for different Multiple-Input-Multiple-Output (MIMO) modes of operation.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and related techniques are commonly referred to as MIMO.

The 3GPP LTE standard is currently evolving with enhanced MIMO support. A core component in LTE is the support of MIMO antenna deployments and MIMO related techniques. A current working assumption in LTE-Advanced is the support of an 8-layer spatial multiplexing mode for 8 transmit (Tx) antennas, with the possibility of channel dependent precoding. The spatial multiplexing mode provides high data rates under favorable channel conditions.

With spatial multiplexing, an information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI). The PMI value specifies a unique precoder matrix in the codebook for a given number of symbol streams.

If the precoder matrix is confined to have orthonormal columns, then the design of the codebook of precoder matrices corresponds to a Grassmannian subspace packing problem. In any case, The r symbols in the symbol vector s each correspond to a layer and r is referred to as the transmission rank. In this way, spatial multiplexing is achieved because multiple symbols can be transmitted simultaneously over the same time/frequency resource element (TFRE). The number of symbols r is typically adapted to suit the current propagation channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W_{N_T \times r} s_n + e_n \qquad (1)$$

where $e_n$ is a noise/interference vector obtained as realizations of a random process. The precoder, $W_{N_T \times r}$, can be a wideband precoder, which is constant over frequency, or frequency selective.

The precoder matrix is often chosen to match the characteristics of the $N_R \times N_T$ MIMO channel matrix H, resulting in so-called channel dependent precoding. This is also commonly referred to as closed-loop precoding and essentially tries to focus the transmit energy into a subspace which is strong in the sense of conveying much of the transmitted energy to the targeted receiver, e.g., a user equipment (UE). In addition, the precoder matrix also may be selected with the goal of orthogonalizing the channel, meaning that after proper linear equalization at the UE or other targeted receiver, the inter-layer interference is reduced.

In closed-loop precoding for the LTE downlink in particular, the UE transmits, based on channel measurements in the forward link (downlink), recommendations to the eNodeB of a suitable precoder to use. A single precoder that is supposed to cover a large bandwidth (wideband precoding) may be fed back. It also may be beneficial to match the frequency variations of the channel and instead feed back a frequency-selective precoding report, e.g. several precoders, one per frequency subband. This approach is an example of the more general case of channel state information (CSI) feedback, which also encompasses feeding back entities other than precoders, to assist the eNodeB in adapting subsequent transmissions to the UE. Such other information may include channel quality indicators (CQIs) as well as a transmission rank indicator (RI).

For the LTE uplink, the use of closed-loop precoding means that the eNodeB selects precoder(s) and the transmission rank. The eNodeB may thereafter signal the selected precoder that the UE is supposed to use or alternatively apply precoding to the reference signals used for channel estimation in the UE, thus avoiding the need of explicit signaling. The eNodeB also may use certain bitmap-based signaling to indicate the particular precoders within a codebook that the UE is restricted to using, see, e.g., Section 7.2 of the 3GPP Technical Specification, TS 36.213. One disadvantage of such signaling is the use of bitmaps to indicate allowed or disallowed precoders. Codebooks with large numbers of precoders require long bitmaps, and the signaling overhead associated with transmitting long bitmaps becomes prohibitive.

In any case, the transmission rank, and thus the number of spatially multiplexed layers, is reflected in the number of columns of the precoder. Efficiency and transmission performance are improved by selecting a transmission rank that matches the current channel properties. Often, the device selecting precoders is also responsible for selecting the transmission rank. One approach to transmission rank selection involves evaluating a performance metric for each possible rank and picking the rank that optimizes the performance metric. These kinds of calculations are often computationally burdensome and it is therefore an advantage if calculations can be re-used across different transmission ranks. Re-use of calculations is facilitated by designing the precoder codebook to fulfill the so-called rank nested property. This means that the codebook is such that there always exists a column subset of a higher rank precoder that is also a valid lower rank precoder.

The 4-Tx House Holder codebook for the LTE downlink is an example of a codebook that fulfills the rank nested property. The property is not only useful for reducing computational complexity, but is also important in simplifying overriding a rank selection at a device other than the one that has chosen the transmission rank. Consider for example the LTE downlink where the UE selects the precoder and rank, and conditioned on those choices, computes a CQI representing the quality of the effective channel formed by the selected precoder and the channel. Since the CQI thus reported by the UE is conditioned on a certain transmission rank, performing rank override at the eNodeB side makes it difficult to know how to adjust the reported CQI to take the new rank into account.

However, if the precoder codebook fulfills the rank nested property, overriding the rank to a lower rank precoder is possible by selecting a column subset of the original precoder. Since the new precoder is a column subset of the original precoder, the CQI tied to the original precoder gives a lower bound on the CQI if the new reduced rank precoder is used. Such bounds can be exploited for reducing the CQI errors associated with rank override, thereby improving the performance of the link adaptation.

Another issue to take into account when designing precoders is to ensure an efficient use of the transmitter's power amplifiers (PAs). Usually, power cannot be borrowed across antennas because, in general, there is a separate PA for each antenna. Hence, for maximum use of the PA resources, it is important that the same amount of power is transmitted from each antenna, i.e., a precoder matrix W should fulfill $$[ww^*]_{mm} = \kappa, \forall m. \tag{2}$$

Another equivalent way of formulating this is to notice that the rows of W all need to have the same $l^2$-norm, where the $l^2$-norm of a row x with elements $x_k$ is defined as $$\sqrt{\sum_k |x_k|^2}.$$

Thus, it is beneficial from a PA utilization point of view to enforce this constraint when designing precoder codebooks and we hence refer to (2) as the PA utilization property.

Full power utilization is also ensured by the so-called constant modulus property, which means that all scalar elements in a precoder have the same norm (modulus). It is easily verified that a constant modulus precoder also fulfills the full PA utilization constraint in (2) and hence the constant modulus property constitutes a sufficient but not necessary condition for full PA utilization.

As a further aspect of the LTE downlink and associated transmitter adaptation, the UE reports CQI and precoders to the eNodeB via a feedback channel. The feedback channel is either on the Physical Uplink Control Channel (PUCCH) or on the Physical Uplink Shared Channel (PUSCH). The former is a rather narrow bit pipe where CSI feedback is reported in a semi-statically configured and periodic fashion. On the other hand, reporting on PUSCH is dynamically triggered as part of the uplink grant. Thus, the eNodeB can schedule CSI transmissions in a dynamic fashion. Further, in contrast to CSI reporting on PUCCH, where the number of physical bits is currently limited to 20, CSI reports on PUSCH can be considerably larger. Such a division of resources makes sense from the perspective that semi-statically configured resources such as PUCCH cannot adapt to quickly changing traffic conditions, thus making it important to limit their overall resource consumption.

More generally, maintaining low signaling overhead remains an important design target in wireless systems. In this regard, precoder signaling can easily consume a large portion of the available resources unless the signaling protocol is carefully designed. The structure of possible precoders and the overall design of the precoder codebook plays an important role in keeping the signaling overhead low. A particularly promising precoder structure involves decomposing the precoder into two matrices, a so-called factorized precoder. The precoder can then be written as a product of two factors $$W_{N_T \times r} = W_{N_T \times k}^{(c)} W_{k \times r}^{(t)} \tag{3}$$

where an $N_T \times k$ conversion precoder $W_{N_T \times k}^{(c)}$ strives for capturing wideband/long-term properties of the channel such as correlation, while a $k \times r$ tuning precoder $W_{k \times r}^{(t)}$ targets frequency-selective/short-term properties of the channel.

Together, the factorized conversion and tuning precoders represent the overall precoder $W_{N_T \times r}$, which is induced by the signaled entities. The conversion precoder is typically, but not necessarily, reported with a coarser granularity in time and/or frequency than the tuning precoder to save overhead and/or complexity. The conversion precoder serves to exploit the correlation properties for focusing the tuning precoder in "directions" where the propagation channel on average is "strong." Typically, this is accomplished by reducing the number of dimensions k covered by the tuning precoder. In other words, the conversion precoder $W_{N_T \times k}$ becomes a tall matrix with a reduced number of columns. Consequently, the number of rows k of the tuning precoder $W_{N_T \times r}$ is reduced as well. With such a reduced number of dimensions, the codebook for the tuning precoder, which easily consumes most of the signaling resources since it needs to be updated with fine granularity, can be made smaller while still maintaining good performance.

The conversion and the tuning precoders may each have a codebook of their own. The conversion precoder targets having high spatial resolution and thus a codebook with many elements, while the codebook the tuning precoder is selected from needs to be rather small in order to keep the signaling overhead at a reasonable level.

To see how correlation properties are exploited and dimension reduction achieved consider the common case of an array with a total of $N_T$ elements arranged into $N_T/2$ closely spaced cross-poles. Based on the polarization direction of the antennas, the antennas in the closely spaced cross-pole setup can be divided into two groups, where each group is a closely spaced co-polarized Uniform Linear Array (ULA) with $N_T/2$ antennas. Closely spaced antennas often lead to high channel correlation and the correlation can in turn be exploited to maintain low signalling overhead. The channels corresponding to each such antenna group ULA are denoted $H_/$ and $H_\backslash$, respectively. For convenience in notation, the following equations drop the subscripts indicating the dimensions of the matrices as well as the subscript n. Assuming now that the conversion precoder $W^{(c)}$ has a block diagonal structure, $$W^{(c)} = \begin{bmatrix} \tilde{W}^{(c)} & 0 \\ 0 & \tilde{W}^{(c)} \end{bmatrix}. \tag{4}$$

The product of the MIMO channel and the overall precoder can then be written as $$HW = [H_/ \quad H_\backslash] W^{(c)} W^{(t)} \tag{5}$$

$$= [H_/ \quad H_\backslash] \begin{bmatrix} \tilde{W}^{(c)} & 0 \\ 0 & \tilde{W}^{(c)} \end{bmatrix} W^{(t)}$$

$$= [H_/ \tilde{W}^{(c)} \quad H_\backslash \tilde{W}^{(c)}] W^{(t)} = H_{eff} W^{(t)}$$

As seen, the matrix $\tilde{W}^{(c)}$ separately precodes each antenna group ULA, thereby forming a (c) smaller and improved effective channel $H_{eff}$. If $\tilde{W}^{(c)}$ corresponds to a beamforming vector, the effective channel would reduce to having only two virtual antennas, which reduces the needed size of the codebook used for the second tuning precoder matrix $W^{(t)}$ when tracking the instantaneous channel properties. In this case, instantaneous channel properties are to a large extent dependent upon the relative phase relation between the two orthogonal polarizations.

It is also helpful for a fuller understanding of this disclosure to consider the theory regarding a "grid of beams," along with Discrete Fourier Transform (DFT) based precoding. DFT based precoder vectors for $N_T$ transmit antennas can be written in the form $$w_n^{(N_T,Q)} = \begin{bmatrix} w_{1,n}^{(N_T,Q)} & w_{2,n}^{(N_T,Q)} & \ldots & w_{N_T,n}^{(N_T,Q)} \end{bmatrix}^T \quad (6)$$

$$w_{m,n}^{(N_T,Q)} = \exp\left(j\frac{2\pi}{N_T Q}mn\right), m = 0, \ldots, N_T - 1,$$

$$n = 0, \ldots, QN_T - 1,$$

where $w_{m,n}^{(N_T,Q)}$ is the phase of the m:th antenna, n is the precoder vector index (i.e., which beam out of the $QN_T$ beams) and Q is the oversampling factor.

For good performance, it is important that the array gain function of two consecutive beams overlaps in the angular domain, so that the gain does not drop too much when going from one beam to another. Usually, this requires an oversampling factor of at least Q=2. Thus for $N_T$ antennas, at least $2N_T$ beams needed.

An alternative parameterization of the above DFT based precoder vectors is $$w_{l,q}^{(N_T,Q)} = \begin{bmatrix} w_{1,Ql+q}^{(N_T,Q)} & w_{2,Ql+q}^{(N_T,Q)} & \ldots & w_{N_T,Ql+q}^{(N_T,Q)} \end{bmatrix}^T \quad (7)$$

$$w_{m,n}^{(N_T,Q)} = \exp\left(j\frac{2\pi}{N_T}m\left(l + \frac{q}{Q}\right)\right),$$

for $m=0, \ldots, N_T-1$, $l=0, \ldots, N_T-1$, $q=0, 1, \ldots, Q-1$, and where i and q together determine the precoder vector index via the relation $n=Ql+q$. This parameterization also highlights that there are Q groups of beams, where the beams within each group are orthogonal to each other. The q:th group can be represented by the generator matrix $$G_q^{(N_T)} = \begin{bmatrix} w_{0,q}^{(N_T,Q)} & w_{1,q}^{(N_T,Q)} & \ldots & w_{N_T-1,q}^{(N_T,Q)} \end{bmatrix}. \quad (8)$$

By ensuring that only precoder vectors from the same generator matrix are being used together as columns in the same precoder, it is straightforward to form sets of precoder vectors for use in so-called unitary precoding where the columns within a precoder matrix should form an orthonormal set.

Further, to maximize the performance of DFT based precoding, it is useful to center the grid of beams symmetrically around the broad size of the array. Such rotation of the beams can be done by multiplying from the left the above DFT vectors $w_n^{(N_T,Q)}$ with a diagonal matrix $W_{rot}$ having elements $$[W_{rot}]_{mm} = \exp\left(j\frac{\pi}{QN_T}m\right). \quad (9)$$

The rotation can either be included in the precoder codebook or alternatively be carried out as a separate step where all signals are rotated in the same manner and the rotation can thus be absorbed into the channel from the perspective of the receiver (transparent to the receiver). Henceforth, in discussing DFT precoding herein, it is tacitly assumed that rotation may or may not have been carried out. That is, both alternatives are possible without explicitly having to mention it.

One aspect of the above-described factorized precoder structure relates to lowering the overhead associated with signaling the precoders, based on signaling the conversion and the tuning precoders with different frequency and/or time granularity. The use of a block diagonal conversion precoder is specifically optimized for the case of a transmit antenna array consisting of closely spaced cross-poles, but other antenna arrangements exist as well. In particular, efficient performance with a ULA of closely spaced co-poles should also be achieved. However, the method for achieving efficient performance in this regard is not obvious, with respect to a block diagonal conversion precoder structure.

Another aspect to consider is that, in a general sense, the above-described factorized precoder feedback may prevent full PA utilization, and may violate the aforementioned rank nested property. These issues arise from the fact that the two factorized precoders—i.e., the conversion precoder and the tuning precoder—are multiplied together to form the overall precoder and thus the normal rules for ensuring full PA utilization and rank nested property by means of constant modulus and column subset precoders, respectively, do not apply.

Further precoding considerations, particularly in the context of the LTE downlink, include the fact that the PUCCH cannot bear as large a payload size as the PUSCH, for the previously described reasons. Thus, there is a risk of "coverage" problems when a UE reports CSI on the PUCCH. In this regard, it is useful to understand that current precoder designs commonly are optimized for transmissions to/from a single UE. In the MIMO context, this single-user context is referred to as a Single User MIMO or SU-MIMO. Conversely, co-scheduling multiple UEs on the same time/frequency resources is called Multi User MIMO or MU-MIMO. MU-MIMO is gaining increasing interest, but it imposes different requirements on precoder reporting and the underlying precoder structures.

SUMMARY

One aspect of the teachings herein relates to signaling codebook restrictions, to restrict the precoder recommendations being fed back from a remote transceiver, so that precoder selections made by the remote receiver are restricted to permitted subsets of precoders within one or more larger sets. As a non-limiting example, these teachings advantageously provide for precoder restrictions in LTE or LTE-Advanced networks, where ongoing development targets the use of larger, richer sets of precoders, and where the disclosed mechanisms for determining, signaling, and responding to subset restrictions provide significant operational advantages. In one embodiment, a codebook of overall precoders is represented in factorized form by defined combinations of conversion and tuning precoders, where restriction signaling restricts overall precoder selections by restricting one or both of conversion and tuning precoder selections.

Correspondingly, one embodiment disclosed herein comprises a method in a wireless communication transceiver of controlling precoder selection feedback sent to another wireless communication transceiver, where the other transceiver precodes transmissions to the transceiver. As a non-limiting example, the transceiver comprises a mobile terminal or other type of user equipment (UE), and the other transceiver comprises a supporting base station in a wireless communication network. The precoder selection feedback indicates precoder selections by the transceiver, which can be understood as precoder selection recommendations to be considered by the other transceiver in determining the precoding operation it uses for transmitting to the transceiver.

The method includes receiving restriction signaling from the other transceiver that identifies one or more permitted subsets within a defined set of overall precoders, or, where the defined set of overall precoders is represented by defined sets of conversion precoders and tuning precoders, the restriction signaling identifies one or more permitted subsets of precoders within the defined sets of the conversion precoders and tuning precoders. The method further includes generating the precoder selection feedback for sending to the other transceiver based on restricting precoder selections by the transceiver according to said restriction signaling. Here, respective combinations of conversion and tuning precoders correspond to respective ones of the overall precoders.

The permitted subset(s)—i.e., the precoders that are allowed for selection—can be changed dynamically, to reflect changes in operating modes, etc. In one example, there are two or more predetermined subsets of conversion precoders and two or more predetermined subsets of tuning precoders, and the restriction signaling identifies a permitted subset of conversion precoders and a permitted subset of the tuning precoders. In other examples, the restriction signaling identifies the permitted subset of conversion precoders without restricting tuning precoder selections, or vice versa. It also should be noted that there may be a greater or lesser number of tuning precoders and/or tuning precoder subsets than conversion precoders and/or conversion precoder subsets. Nor do the set/subset sizes of tuning precoders necessarily match that used for conversion precoders.

Regardless, the conversion and tuning precoders operate as factorized representations of a set of overall precoders formed from defined combinations of conversion and tuning precoders. This factorized representation is exploited herein in various advantageous ways, such as in how the restriction signaling is formed and processed, and in how the precoder codebooks are structured, stored, and accessed in observance of the dynamically changeable precoder restrictions imposed by the restriction signaling.

As one example, the transceiver stores or otherwise maintains a representation of a conversion precoder codebook, representing a defined set of conversion precoders that are logically grouped into two or more subsets, and likewise stores a tuning precoder codebook representing a defined set of tuning precoders grouped into two or more subsets. Each precoder represents a codebook entry that is identified by, for example, an index value. Thus, in one or more embodiments, the transceiver generates the precoder selection feedback as indications of the index values corresponding to the precoders it selects from the conversion and tuning precoder codebooks, with the understanding that such defined pairings represent in factorized form an overall precoder to be considered by the other transceiver.

Advantageously, the restriction signaling indicates conversion precoder restrictions, tuning precoder restrictions, or both. Thus, the precoder selection feedback at any given time indicates a selected conversion precoder, or a selected tuning precoder, or both, where those selections are restricted to the currently permitted subset(s). As such, the restriction signaling effectively restricts the transceiver's precoding recommendations to those overall precoders that are formed from the conversion and tuning precoders that are candidates for selection by the transceiver by virtue of their membership in the currently permitted subset(s) of conversion and tuning precoders.

Advantageously, then, one or more codebooks of precoders can be "parameterized" in the sense that one or more predefined subsets within such codebooks can be associated with one mode of operation or with certain operating parameters, while one or more other predefined subsets can be associated with another mode of operation or with certain other operating parameters, and codebook restrictions can be signaled simply by signaling an indication of the mode or parameter(s) that are in effect. A non-limiting example comprises splitting the conversion and/or tuning precoder codebook into one subset favored for SU-MIMO use and one subset favored for MU-MIMO use.

With these non-limiting possibilities in mind, the method further comprises generating the precoder selection feedback for sending to the other transceiver. Particularly, the precoder selection feedback is generated based on restricting conversion and tuning precoder selections according to said restriction signaling. That is, the transceiver considers only those precoders that are candidates for selection by virtue of their membership in the one or more subsets of precoders that are indicated by the restriction signaling as being permitted for consideration.

In complementary fashion, the teachings herein include a method for a first transceiver to signal precoder selection restrictions to a second transceiver, with the understanding that the first transceiver receives precoder selection feedback from the second transceiver, to consider in determining the precoding operation it applies for precoding transmissions to the second transceiver. The first transceiver may be, by way of non-limiting example, a network base station, such as an eNodeB in an LTE or LTE-Advanced network. Correspondingly, the second transceiver comprises a user terminal or other such user equipment (UE).

In one embodiment, the method includes the first transceiver determining a restriction that limits precoder selection by the second transceiver to one or more permitted subsets of precoders within defined sets of conversion precoders and tuning precoders. The method further includes generating restriction signaling for indicating the one or more permitted subsets to the second transceiver, which may store the defined sets of conversion and tuning precoders as conversion and tuning precoder codebooks. The restriction(s) thus can be understood as limiting conversion and/or tuning precoder selections by the second transceiver to permitted subset(s) within the conversion and/or tuning precoder codebooks. In effect, then, this allows the first transceiver to limit selections of an overall precoder by the second transceiver to a given subset of overall precoders within a codebook of overall precoders.

To make the restrictions active at the second transceiver, the first transceiver sends restriction signaling to the second transceiver, to restrict precoder selection by the second transceiver to the one or more permitted subsets. Again, the conversion and tuning precoders represent a set of overall precoders in factorized form, such that precoder recommendations by the second transceiver can be restricted to a desired subset of the overall precoders based on indicating corresponding selection restrictions for the conversion and/or tuning precoders.

In a non-limiting example, the first transceiver, which again may be network base station of some type, operates in a SU-MIMO mode at certain times, and operates in an MU-MIMO mode at certain other times. Certain ones of the overall precoders or, equivalently, certain ones of the conversion and/or tuning precoders, are predefined as being associated with the SU-MIMO mode of operation and certain other ones are predefined as being associated with the MU-MIMO mode of operation. Thus, as the first transceiver dynamically switches between SU-MIMO and MU-MIMO modes of operation, it uses the restriction signaling to identify which mode is active. That indication effectively identifies the permitted subset(s) of precoders to the second transceiver as it is configured to associate one or more precoder subsets with SU-MIMO operation and one or more other precoder subsets with MU-MIMO operation.

Similarly, the precoders can be grouped into different subsets according to one or more other parameters. For example, one subset of the precoders may include only precoders that satisfy a full PA utilization property for power amplifier utilization at the first transceiver. Another subset of precoders does not satisfy the full PA utilization property. In this manner, when the first transceiver prioritizes full PA utilization, it uses its restriction signaling to identify as the permitted subset(s) only those precoders that satisfy the full PA utilization property. Otherwise, the restriction signaling can be used to identify as the permitted subset(s) those precoders that do not satisfy the property. Such control can be effected, for example, by setting or clearing a flag conveyed by the restriction signaling, where the second transceiver is configured to recognize the state of that flag as indicating which precoder subset(s) are permitted.

Of course, the present invention is not limited to the above brief summary of features and advantages. Other features and advantages will be recognized from the following detailed discussion of example embodiments and from the accompanying drawings.

BRIEF DESCRIPTION OF THE DRAWINGS

FIG. 2 is a diagram of one embodiment of logical subsets of precoders within a larger codebook of precoders.

FIG. 3 is a diagram of one embodiment of logically separating precoders within a codebook into currently permitted and currently non-permitted subsets, to restrict precoder selection recommendations.

FIG. 4 is a diagram of one embodiment of logically separating precoders within a codebook into first and second pluralities, such as where the first plurality of precoders is associated with one operating mode and the second plurality of precoders is associated with another operating mode.

FIG. 5 is a diagram of one embodiment of a signaling structure used for efficiently signaling precoder restrictions.

FIG. 6 is a diagram of one embodiment of logically separating precoders within a codebook into different types of precoders.

FIG. 7 is a diagram of one embodiment of storing/maintaining precoder codebooks, where each codebook is used to maintain a different type of precoder.

FIG. 8 is a diagram of one embodiment of maintaining factorized precoders, wherein a recommended precoder is defined or formed as the matrix multiplication of a selected pair of the factorized precoders.

DETAILED DESCRIPTION

Figure 1:
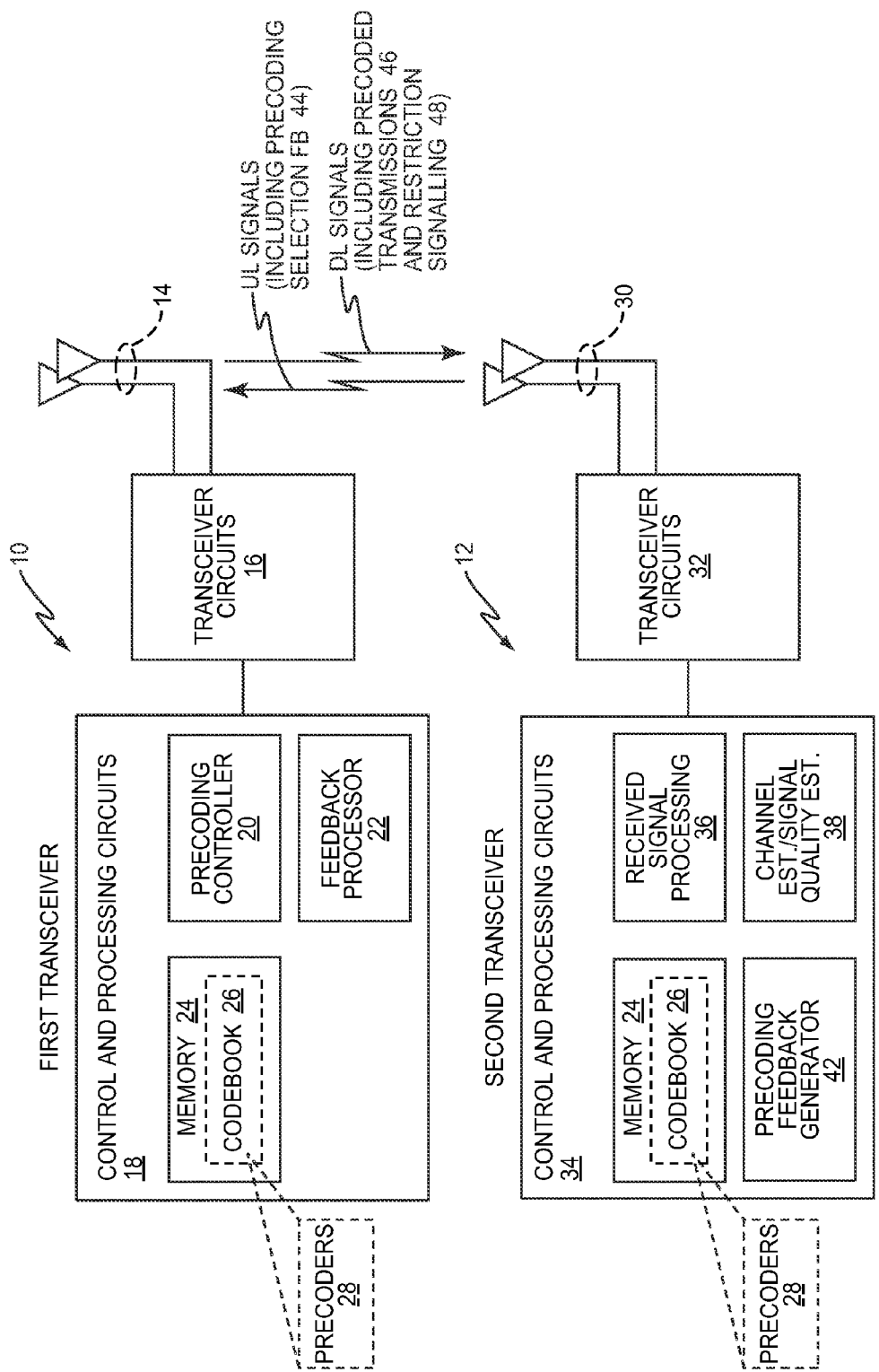
FIG. 1 is a block diagram of example embodiments of a first transceiver that is configured to transmit precoded transmissions to a second transceiver.

FIG. 1 depicts a first wireless communication transceiver 10 and a second wireless communication transceiver 12, referred to for convenience as transceivers 10 and 12. The transceiver 10 includes a number of antennas 14 and associated transceiver circuits 16 (including one or more radiofrequency receivers and transmitters), along with control and processing circuits 18. At least functionally, the control and processing circuits 18 include a precoding controller 20, a feedback processor 22, and one or more memory circuits 24 that maintain a set 26 of overall precoders 28. The transceiver 10 in one or more embodiments maintains a codebook representation of the defined set 26 of overall precoders 28, and this disclosure thus equivalently refers to the set 26 as the "codebook" 26. Here, a "codebook representation" comprises, for example, a stored set of precoding entries that are accessed or otherwise identified according to predefined index values— e.g., there is predetermined mapping of precoder entries to codebook index positions.

It is also contemplated herein that the set 26 of precoders 28 may be maintained in another, larger codebook of precoder entries, which may include other types of precoders and/or precoders having properties different from the overall precoders 28 in the set 26. In at least one embodiment, at least some of the overall precoders 28 are DFT-based precoders that provide for beamforming of transmissions by the transceiver 10, where each such precoder represents a unique combination of one "conversion" precoder and one "tuning" precoder. That is, in factorized form, each such overall precoder 28 is formed, e.g., by the matrix multiplication of one conversion precoder and one tuning precoder. Thus, the set 26 of overall precoders 28 may be alternately (and equivalently) represented as sets of conversion and tuning precoders.

As for the set 26, it will be understood that it comprises, for example, a "codebook" of entries, with each entry representing one of the precoders 28 in the set 26. The number "28" is used generally as a reference in the both the singular and plural senses, for referring to one or multiple precoders 28. Suffix designations are used, too, where helpful for clarity, e.g., precoder 28-1, precoder 28-2, and so on. As used in this sense, "precoder" means a matrix of vector of antenna-weighting values to be applied for transmitting a signal from a set of transmit antenna ports.

The second transceiver 12 includes a number of antennas 30 and associated transceiver circuits 32 (including one or more radio frequency receivers and transmitters), along with control and processing circuits 34. At least functionally, the control and processing circuits 34 include received signal processing circuitry 36, e.g., demodulation/decoding circuits, and further include one or more estimation circuits 38, for estimating channel conditions and/or signal quality. Because the ability of the second transceiver 12 to receive spatially-multiplexed or other precoded transmissions from the first transceiver 10 depends on propagation channel conditions, the transceiver 12 uses its evaluation of signals received from the first transceiver 10 to estimate channel conditions, and those estimates provide a basis for the second transceiver 12 making precoder recommendations to the first transceiver 10.

In support of such functionality, the control and processing circuits 34 include one or more memory circuits 40, and a precoding feedback generator 42. The memory circuit(s) 40 store, for example, the same codebook 26 of precoders 28 as stored at the transceiver 10. In this manner, the transceiver 12 can send precoder selection feedback 44 to the transceiver 10 by sending PMI values. The PMI values indicate the codebook index value of the precoder(s) 28 selected by the transceiver 12, representing the precoder(s) 28 recommended by the second transceiver 12, for use by the first transceiver 10 in precoding transmissions to the second transceiver 12. These recommendations change dynamically, such as in response to changing channel conditions between the first and second transceivers 10 and 12.

To constrain or otherwise restrict the precoder selections made by the transceiver 12, the transceiver 10 transmits restriction signaling 48. Advantageously, the teachings herein disclose various approaches to parameterizing the set 26 of overall precoders 28, wherein one or more subsets of precoders 28 within the codebook 26 are viewed as being "permitted" for use when a given parameter or parameters take on a certain value, while other one(s) of the precoder subsets are considered as being "permitted" when the parameter values change. As an example introduction, the parameter of interest may be the transmission mode of the transceiver 10, wherein the mode has two values: SU-MIMO and MU-MIMO. One subset of precoders 28 in the codebook 26 is favored for use with SU-MIMO, while another subset is favored for use with MU-MIMO. Thus, the value of a transmission mode parameter—e.g., set when MU-MIMO is active and cleared when SU-MIMO is active—may be used to indicate which precoder subset(s) are permitted for use within the codebook 26.

With regard to this non-limiting example, one sees that the approach advantageously provides reduced signaling overhead. That is, the restriction signaling 48 may comprise a flag or other logical indicator, however, it is not so limited and may use other formats and include other information. In any case, the restriction signaling 48 should be understood as indicating to the transceiver 12 which subset(s) of precoders 28 in its codebook are permitted for selection as precoding recommendations to the transceiver 10. Moreover, in one or more embodiments, the transceiver 12 is advantageously configured to use the same signaling format for its precoder selection feedback 44 regardless of whether subset restrictions have been imposed on its precoder selections, and regardless of the particulars of any such restrictions. Among other things, keeping the same signaling format across changing restrictions simplifies processing and transmission of the precoder selection feedback 44 by the transceiver 12, simplifies reception and processing of precoder selection feedback 44 by the transceiver 10, and provides for a consistent signaling overhead.

In one or more embodiments, the control and processing circuits 18 of the transceiver 10 at least in part comprise computer-based circuitry, e.g., one or more microprocessors and/or digital signals processors, or other digital processing circuitry. In at least one embodiment, such circuitry is specially configured to implement the methods taught herein for the transceiver 10, based on executing stored computer program instructions, such as may be stored in the memory circuit(s) 24. Likewise, in at least one embodiment, the control and processing circuits 34 at the second transceiver 12 are implemented at least in part via programmable digital processing circuitry. For example, the control and processing circuits 34 in one or more embodiments include one or more microprocessors or digital signal processors configured to implement at least a portion of the methods taught herein for the transceiver 12, based on executing computer program instructions stored in the one or more memory circuits 40.

With these example implementation details in mind, the transceiver 12 is configured to control precoder selection feedback 44 sent to another transceiver 10, where the other transceiver 10 precodes transmissions 46 to the transceiver 12. The precoder selection feedback 44 indicates precoders 28 dynamically selected by the second transceiver 12 from a defined codebook 26 of precoders 28. The transceiver 12 includes a memory 40 configured to store the codebook 26 of precoders 28. Further, as noted, the transceiver 12 includes a precoding feedback generator 42, which is configured to manage the codebook 26 as two or more predetermined subsets of precoders, wherein at least one predetermined subset includes more than one of the precoders 28 in the codebook 26. That is, at least one of the subsets is not a set of one.

As an example, refer momentarily to FIG. 2 where an example codebook 26 includes a plurality of precoders 28, individually depicted as 28-1, 28-2, 28-3, and so on. As will be understood by those of ordinary skill in the art, each precoder 28 is, for example, a matrix of numerical values corresponding to transmit antenna signal weights. One sees that there are a total of N precoders 28 in the example illustration, with those N precoders 28 subdivided into a number of subsets 50. At least one subset 50 includes more than two of the precoders 28. By way of non-limiting example, the N precoders 28 are divided into two subsets referred to as 50-1 and 50-2. For illustration, the subset 50-1 includes at least the precoders 28 identified as 28-1, 28-2, and 28-3, which are also identified as "ENTRY 1," "ENTRY 2" and "ENTRY 3" in the drawing. The subset 50-2 includes at least the precoders 28 referred to 28-(N−1) and 28-N, which are also identified as "ENTRY N−1", and "ENTRY N."

Thus, in this example instance, each subset 50-1 and 50-2 includes more than one precoder 28 in the overall set of N precoders 28. Advantageously, the transceiver 10 is configured to generate restriction signaling 48 that efficiently indicates which one(s) of the subsets 50 are currently permitted for use by the transceiver 12 in generating the precoder selection feedback 44. For example, one subset 50 might be associated with one operating mode, while another subset 50 might be associated with another operating mode. The transceiver 10 can simply set or clear a flag or mode indicator to indicate which subset 50 currently is to be considered as the "permitted" subset for precoder selections by the transceiver 12.

Correspondingly, the receiver in the transceiver circuits 32 of the transceiver 12 is configured to receive signaling from the transceiver 10, including the restriction signaling 48. As noted, the restriction signaling 48 indicates which one or more of the predetermined subsets 50 are currently permitted subsets 52 (as shown in FIG. 3) for use by said transceiver 12 in determining the precoder selection feedback 44. Here, the precoding feedback generator 42 is configured to restrict precoder selection for the precoder selection feedback 44 to those precoders 28 in the currently permitted subsets 52. Conversely, the remaining subsets among the defined subsets 50 would be considered as non-permitted subsets 54, and the individual precoders 28 having membership in the non-permitted subsets 54 would therefore be excluded from consideration in the generation of the precoder selection feedback 44.

In one embodiment, and with reference to FIG. 4, the transceiver 12 is configured to manage the codebook 26 as two or more predetermined subsets 50 by associating a first plurality 56 of precoders 28 in the codebook 26 with a first operating mode and associating a second plurality 58 of precoders 28 in the codebook 26 with a second operating mode. As a non-limiting example, the first plurality 56 of precoders 28 is intended for use in a particular operating mode, while the second plurality 58 of precoders 28 is intended for use in a different operating mode. The first mode is, for example, SU-MIMO, while the second mode is MU-MIMO. In at least one embodiment where the subsets 50 of precoders 28 are grouped according to modes, the restriction signaling 48 comprises a mode indicator that indicates the operating mode that is or will be active, and thus indicates which mode applies for the selection of precoders 28 from the codebook 26.

With reference to FIG. 5, one sees an embodiment of the restriction signaling 48, wherein the signaling comprises a message identifier (ID) 60 and an indicator 62. As an example, the message ID 60 is a unique numeric value associated with restriction signaling, and the transceiver 12 is configured to recognize the restriction signaling 48, based on recognizing the identifier 60. In at least one embodiment, the indicator 62 comprises a mode indicator. For example, the mode indicator may be a single bit that is set to indicate that one mode is active, or cleared to indicate that another mode is active. The transceiver 12 in such an embodiment would restrict its precoder selections (recommendations) to those precoders 28 that are logically associated with the indicated mode—i.e., to those precoders 28 that are permitted for the indicated mode.

Of course, to the extent that more than two modes are defined, the indicator 62 may comprise a multi-bit binary value that indicates which one (or ones) of the defined modes are active. Similarly, in one or more embodiments, there are N precoders 28 in total in the codebook 26, where N is an integer>2. Further, there are M predetermined subsets 50 defined within the overall set of N precoders 28, where M<N. With this relationship, at least one subset 50 (e.g., subset 50-1 or 50-2) includes more than one precoder 28. Correspondingly, the restriction signaling 48 in one or more embodiments includes an M-length bit mask that indicates which ones of the M predetermined subsets 50 are currently permitted subsets 52. Alternatively, the restriction signaling 48 includes one or more binary values, e.g., the indicator 62 is formed as one or more binary values, where each value indicates which one or ones of the subsets 50 are to be treated by the transceiver 12 as currently permitted subsets 52.

Thus, as seen in FIG. 6, the codebook 26 in one or more embodiments can be regarded as dividing into at least a first type 64 of precoders 28 and a second type 66 of precoders 28. Both types may be represented using similar matrix/vector structures, but they may have values that yield different operating characteristics for the transceiver 10, or values that are optimized for certain operating conditions at the transceiver 10. Thus, the transceiver 10 would restrict precoder selections by the transceiver 12 to whichever precoder type best suits the current operating conditions or mode.

Further, note that in one or more embodiments herein the precoders 28 in the codebook 26 stored at the transceiver 10 are regarded as and hereafter referred to as "overall" precoders 28 in the sense that they can be understood as representing the combination of a selected conversion precoder and a selected tuning precoder, which were discussed in example form earlier herein. With this understanding, a selected conversion precoder and a selected tuning precoder are understood as a "factorized" representation of a selected overall precoder 28, in the sense that, e.g., the matrix product of the selected conversion and tuning precoders forms the corresponding selected overall precoder 28.

In this manner, it is equivalent to restrict precoder selections to defined subsets of overall precoders 28, or to restrict precoder selections to defined subsets of the conversion and tuning precoders representing the factorized form of the overall precoders 28. In this sense, the transceiver 10 and/or the transceiver 12 may store the overall precoders 28 in the codebook 26, or the codebook 26 may be structured as two codebooks, one containing conversion precoders and one containing tuning precoders. The use of factorized conversion and tuning precoder codebooks, and the use of restriction signaling 48 that indicates conversion and/or tuning precoder restrictions offers a number of advantages, in terms of being able to flexibly define the subset restrictions and in terms of being able to efficiently signal such restrictions.

An example arrangement appears in FIG. 7, where the codebook 26 is depicted as comprising a conversion precoder codebook 70 of conversion precoders 74, and a tuning precoder codebook 72 of tuning precoders 76. FIG. 8 illustrates that the plurality of conversion precoders 74 at least logically may be regarded as a larger, defined set 80 of conversion precoders 74 that is subdivided into two or more subsets 82. Likewise, the plurality of tuning precoders 76 may be regarded as a larger, defined set 86 of tuning precoders that is subdivided into two or more subsets 88. Note that the subset sizes or numbers may not necessarily be equal between the codebooks. It will be appreciated then, that the transceiver 10 may maintain a codebook or set 26 of precoders 28, where at least some number of those precoders 28 are "overall" precoders, each representing a unique combination of one conversion precoder 74 and one tuning precoder 76. Thus, precoder restrictions may be generated and signaled in terms of which ones of the overall precoders are permitted for use, or, equivalently, in terms of which ones of the conversion precoders 74 and/or tuning precoders 76 are permitted for use.

For example, the restriction signaling 48 from the transceiver 10 can be generated and signaled dynamically as needed, to indicate which ones of the subsets 82 and/or the subsets 88 are to be considered by the transceiver 12 as "permitted" for use in generating the precoder selection feedback 44. The illustration shows that one subset 82 of conversion precoders 74 is a permitted subset 84-1 and that one subset 88 of tuning precoders 76 is a permitted subset 84-2. It will be understood that restrictions may be applied to the subsets 82 of conversion precoders 74, the subsets 88 of tuning precoders 76, or both. The particular manner in which restriction is applied will depend upon the factorization details applicable to the conversion and tuning precoders 74 and 76.

As noted, the transceiver 12 may be a UE or other type of wireless communication device, and the transceiver 10 may be an eNodeB in an LTE or LTE-Advance network, or may be another type of wireless communication network base station. In at least one such embodiment, the transceiver 12 is configured to receive said restriction signaling 48 as Radio Resource Control (RRC) layer signaling. Also note that the transceiver 12 in one or more embodiments does not necessarily operate with precoder selection restrictions. For example, in one embodiment, the precoding feedback generator 42 is configured to use or not use subset restrictions in its precoder selections, in dependence on the restriction signaling 48. For example, there is a defined signaling value or pattern that indicates whether restriction should be used, or the absence of an explicitly signaled restriction value is taken to mean that restriction is not in use.

Figure 9:
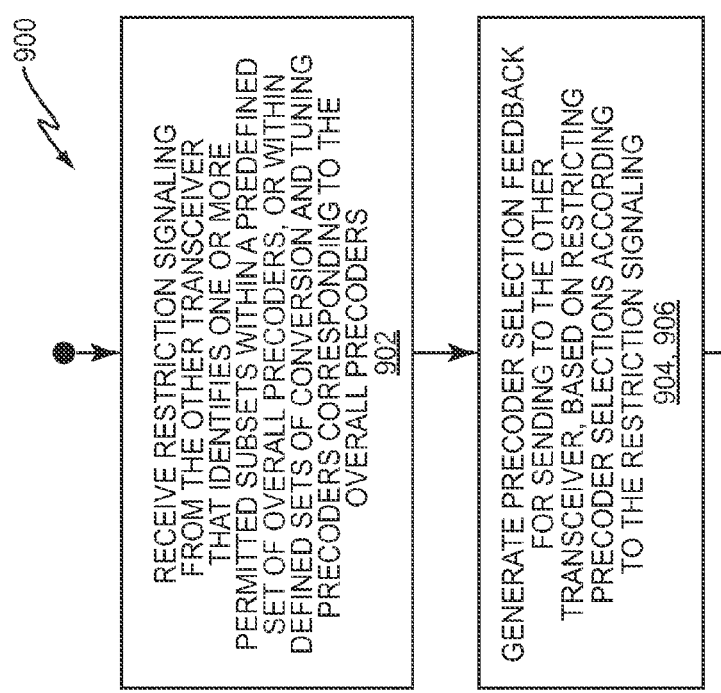
FIG. 9 is a logic flow diagram illustrating one embodiment of a method of precoder feedback generation at a second transceiver, responsive to restriction signaling from a first transceiver.

With the above possibilities for operation of the transceiver 12 in mind, FIG. 9 illustrates a method 900 carried out in the transceiver 12 with respect to the transceiver 10. The illustrated method 900 includes receiving (Step 902) restriction signaling 48 from the transceiver 10 that identifies one or more permitted subsets 50 within a defined set 26 of overall precoders 28, or, where the defined set 26 of overall precoders 28 is represented by defined sets 80, 86 of conversion precoders 74 and tuning precoders 76, the restriction signaling 48 identifies one or more permitted subsets 84 of precoders 74, 76 within the defined sets 80, 86 of said conversion precoders 74 and tuning precoders 76. The method 900 further includes generating (Step 904) said precoder selection feedback (44) for sending to the other transceiver (10) based on restricting (Step 906) precoder selections by the transceiver (12) according to the restriction signaling (48).

Thus, the restriction signaling 48 may be generated and transmitted by the transceiver 10, in explicitly in terms of the precoders 28 within the defined set 26—i.e., to identify a permitted subset 50 of such precoders 28. Alternatively but equivalently, the transceiver 10 may generate and transmit the restriction signaling 48 in terms of permitted subsets 84 of precoders 74, 76 within the defined sets 80, 86 of conversion precoders 74 and tuning precoders 76. More particularly, conversion and/or tuning precoder selection may be restricted, to achieve an equivalent restriction on selection of precoders 28. Moreover, in one or more embodiments, the restriction signaling 48 identifies a permitted subset or subsets 50 of (overall) precoders 28, and the transceiver 12 maps or otherwise translates such restrictions into conversion and/or tuning precoder selection restrictions.

On that point, as noted, respective combinations of conversion and tuning precoders 74, 76 correspond to respective ones of the overall precoders 28. That is, each such overall precoder 28 represents a unique combination of one conversion precoder 74 and one tuning precoder 76. Correspondingly, in at least one embodiment of the method 900, a conversion precoder codebook 70 contains the defined set 80 of conversion precoders 74 and a tuning precoder codebook 72 contains the defined set 86 of tuning precoders 76, and restriction signaling 48 indicates at least one of: (a) a permitted subset 84-1 of conversion precoders 74 in the conversion precoder codebook 70 and (b) a permitted subset 84-2 of tuning precoders 76 in said tuning precoder codebook 72.

It will be understood that the precoder selection feedback 44 may simultaneously indicate the selected conversion and tuning precoders, or it may indicate the selected conversion precoder in some instances and the selected tuning precoder in other instances. As an example of this, the conversion precoder selection interval is slower than the tuning precoder selection interval—i.e., tuning precoder selections are updated more frequently than conversion precoder selections. Thus, the precoder selection feedback 44 need not indicate conversion precoder selections as frequently as tuning precoder selections. Similarly, the precoder selection feedback 44 may be sent on different channels or even protocol layers. In other variations, a conversion precoder selection covers a relatively wide frequency band, which is subdivided into narrower sub-bands and respective tuning precoder selections are signaled respectively for each sub-band.

Figure 10:
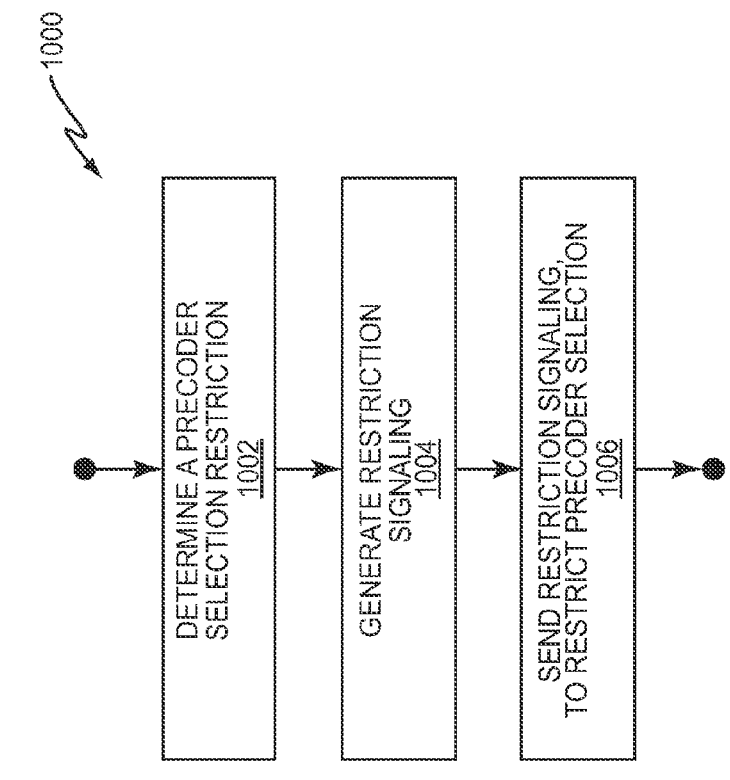
FIG. 10 is a logic flow diagram illustrating one embodiment of a method of precoder selection restriction and signaling at a first transceiver, to restrict the precoder recommendations made by a second transceiver receiving precoded transmissions from the first transceiver, to one or more currently permitted subsets within a larger set of precoders.

Turning to the transceiver 10, FIG. 10 illustrates a method 1000, wherein the precoding controller 20 of the transceiver 10 determines (Step 1002) a restriction that limits precoder selection by said transceiver 12 to one or more permitted subsets 84 of precoders 74, 76 within defined sets 80, 86 of conversion precoders 74 and tuning precoders 76. The method also includes generating (Step 1004) restriction signaling 48 for indicating the one or more permitted subsets (84) to the transceiver 12, and sending (Step 1006) the restriction signaling 48 to the other transceiver 12. Doing so serves to restrict precoder selection by the transceiver 12 to said one or more permitted subsets (84), so that the precoding recommendations made by the transceiver 12 are consistent with the restrictions.

The precoding controller 20 is further configured to generate the restriction signaling 48 to indicate the restriction. It will be understood that this may be a dynamic process, where the restriction signaling 48 is updated as needed, to reflect changing restrictions. A transmitter in the transceiver circuits 16 of the transceiver 10 is cooperatively associated with precoding controller 20, and is configured to transmit the restriction signaling 48.

Figure 11:
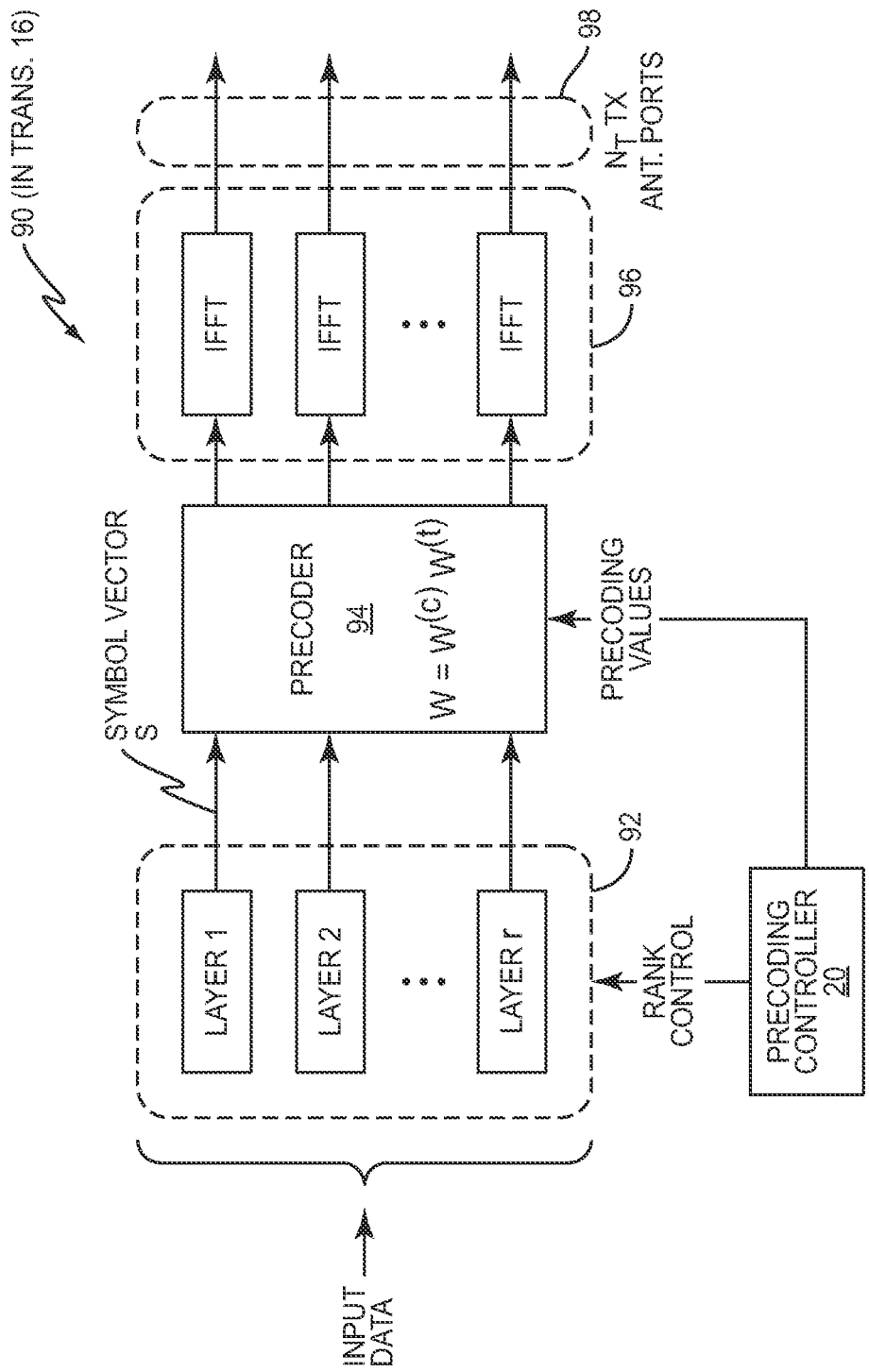
FIG. 11 is a block diagram of one embodiment of a precoding circuit, such as may be implemented in the first transceiver of FIG. 1.

In FIG. 11, one sees an example embodiment of precoding circuitry 90, such as is implemented on or in conjunction with the precoding controller 20 and transceiver circuit 16 of the transceiver 10. The illustrated circuitry is used for generating the precoded transmissions 46, for transmission to the transceiver 12. Of course, other transceivers besides transceiver 12 may be supported. The precoding circuitry 90 includes layer processing circuitry 92, which forms symbol vectors of length s, for transmit layer in use for MIMO transmission by the transceiver 10, where the precoding controller 20 sets the transmit rank. The circuitry further includes a precoder 94, which applies the precoding operations used for generating precoded transmissions from the antennas 14 of the transceiver 10, including the precoded transmissions 46 to the transceiver 12. Note that the precoding operation applied for precoding transmissions to the transceiver 12 is determined in consideration of the precoder selection feedback 44 from the transceiver 12, but does not necessarily follow that feedback.

Notable in the illustration is Inverse Fast Fourier Transform (IFFT) processing circuitry 96 feeding into a plurality of transmit antenna ports 98. In one or more embodiments taught herein, each conversion precoder 74 comprise a block diagonal matrix, where each block comprises a DFT-based precoder that provides for a number of beams, for beamforming from a subset of the $N_T$ antenna ports 98. In at least one such embodiment, the defined set 80 of conversion precoders 74 includes $N_T Q$ different conversion precoders 74 and the defined set 86 of tuning precoders 76 includes a number of corresponding tuning precoders 76.

Each conversion precoder 74 comprises a block diagonal matrix in which each block comprises a DFT-based precoder that defines $N_T Q$ different DFT based beams for a subgroup in the group of $N_T$ transmit antenna ports 98 at the transceiver 10, where Q is an integer value and where the $N_T Q$ different conversion precoders 74, together with one or more of the tuning precoders 76, correspond to a set of $N_T Q$ different overall precoders 28. Each overall precoder 28 thus represents a size—$N_T$ DFT-based beam over the group of $N_T$ transmit antennas ports (98).

Figure 12:
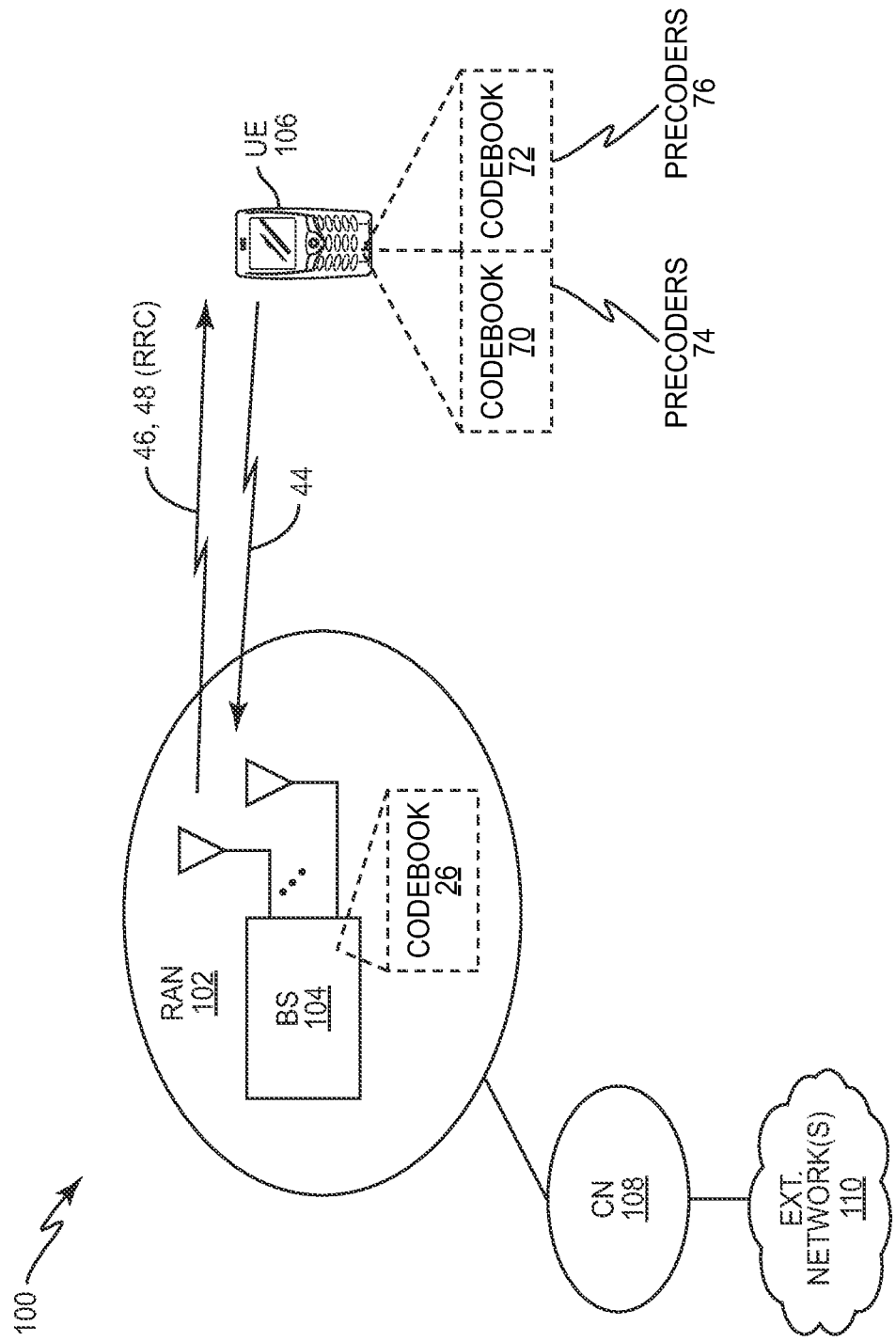
FIG. 12 is a block diagram of one embodiment of a wireless communication, wherein precoding restriction signaling and precoder selection restrictions as taught herein are used between a base station and an item of user equipment (a "UE").

Turning to FIG. 12, one sees that the transceiver 10 may be implemented as part of wireless communication network 100, which includes a Radio Access Network (102), including one or more base stations 104. Here, it will be understood that the base station 104 represents the transceiver 10, but may include additional interface and processing circuitry not discussed thus far. However, as such circuitry is not germane to this discussion and, in any case, is generally well understood in the base station design arts, the overall architecture of the base station 104 is not detailed.

One also sees in FIG. 12 an item of user equipment, i.e., UE 106, which may be understood as representing a particular embodiment of the transceiver 12. As with the base station 104, the UE 106 includes interface and processing circuitry not previously described herein. However, as such circuitry is well understood in a general sense and is not germane to the discussion, it is not further detailed here. One also sees that the RAN 102 is communicatively coupled to a Core Network (CN) 108, the implementation of which will depend upon the wireless communication standards at issue, e.g., it may be an Evolved Packet Core (EPC) in an LTE/LTE-Advanced implementation. The CN 108 generally is communicatively coupled to one or more external networks 110, such as the Internet and allows call and data delivery to/from multiple UEs 106, which are supported by radio links to the RAN 102.

The base station 104 is configured to transmit precoded transmissions to the illustrated UE 106, based at least in part on receiving precoder selection feedback 44 from the UE 106. In particular, however, the UE's selection of precoders for recommendation to the base station 104 is restricted according to its receipt of restriction signaling 48. In this context, the base station 104 stores a codebook 26 of overall precoders 28. The base station 104 alternatively organizes its codebook 26 as a conversion precoder codebook 70 and a tuning precoder codebook 72, where individual pairings of the conversion and tuning precoders 74 and 76 represent respective overall precoders 28 in factorized form.

Further in the illustrated arrangement, the UE 106 stores the same or equivalent codebooks, so that its indications of precoder selections are understood by the base station 104. For example, UE 106 stores a conversion precoder codebook 70 and a tuning precoder codebook 72. The base station 104 stores copies of the same codebook, or, as mentioned, it stores a codebook 26 of overall precoders 28 that correspond to the codebooks stored by the UE 106. In any case, the UE 106 is configured to respond to restriction signaling 48 received from the base station 106, by restricting its precoder recommendations to those precoders that are in currently permitted subsets, as indicated by the restriction signaling.

As for the base station's precoding in particular, and for precoding by the transceiver 10 in a more general example, one may turn back to the precoding circuit 90 of FIG. 11. The layer processing circuitry 92 converts a stream of input data, e.g., an input symbol stream, into one or more symbol vectors s. As explained, the precoding controller 20 provides a rank control signal to the layer processing circuitry 82, to control the number of layers to which the input data is mapped. The symbol vector(s) s are input to precoder 94, which applies a precoding operation. For example, it forms an overall precoder 28, denoted as W, as the matrix multiplication of a selected conversion precoder 74, denoted as $W^{(c)}$, and a selected tuning precoder 76, denoted as $W^{(t)}$. This precoding operation may or may not follow the recommendations represented by the precoder selection feedback 44, but the precoding controller 20 is configured to consider that feedback in determining the currently applied precoding operation. The precoded stream(s) are output to the IFFT circuitry 96, which applies an IFFT to the streams. After that transformation, the steams are directed to respective ones in a set of antenna ports 98, for transmission from the transmitter's antennas 14.

In at least one embodiment, the transceiver 10 uses Discrete Fourier Transform (DFT) based precoders implementing a partially overlapping grid of beams. This approach is suitable for closely spaced co-polarized antennas such as a Uniform Linear Array with $N_T$ elements. Thus, it will be understood that in one or more embodiments, the overall precoders 28 in the codebook 26 include a number of DFT-based precoders. For example, the overall precoders 28 may be represented by a number of DFT-based conversion precoders 74 and associated tuning precoders 76, such as illustrated in FIG. 8.

DFT based precoders are also suitable for the two $N_T/2$ element antenna group ULAs in a closely spaced cross-pole setup. By a clever choice of the codebook entries for the conversion and tuning precoders 74 and 76 and by exploiting them jointly, the teachings herein ensure re-use of the DFT based size $N_T/2$ precoders for antenna group ULAs also in forming the needed number of DFT based size $N_T$ precoders for an $N_T$ element ULA. Moreover, one or more embodiments disclosed herein provide a structure for the conversion precoders 74 that allows re-using existing codebooks with DFT based precoders and extending their spatial resolution.

Further, in at least one embodiment, it is proposed herein to use a precoder structure which solves the problems related to PA utilization and rank nested property for a factorized precoder design—e.g., in the case where an overall precoder W is represented in factorized form by a conversion precoder 74 and a tuning precoder 76. By using a so-called double block diagonal tuning precoder 76 combined with a block diagonal conversion precoder 74, full PA utilization is guaranteed and rank override exploiting nested property also for the overall precoder is possible. However, it should be kept in mind that these and other special precoder types and structures may be represented in subsets or groups within a larger number of precoders and that systems configured according to the teachings herein may use codebook having additional entries that do not conform to some of the specialized block diagonal and other forms described herein.

In any case, an example embodiment herein allows DFT based precoder elements for an antenna group ULA in a closely spaced cross-pole to be reused for creating a grid of beams with sufficient overlap for a ULA of twice the number of elements compared with the antenna group ULA. In other words, the overall precoders 28 in the codebook 26 can be designed for use with the multiple antennas 14 of the transceiver 10, regardless of whether those antennas 14 are configured and operated as an overall ULA of $N_T$ antennas or antenna elements, or as two cross-polarized ULA sub-groups, each having $N_T/2$ antennas or antenna elements.

Consider the block diagonal factorized precoder design given as $$W = W^{(c)}W^{(t)} = \begin{bmatrix} \tilde{W}^{(c)} & 0 \\ 0 & \tilde{W}^{(c)} \end{bmatrix} W^{(t)}, \quad (10)$$

where W=an overall precoder 28 and $W^{(c)}$ and $W^{(t)}$ represent the conversion/tuning precoder pairing from which W is formed. Also, note that in order to tailor the transmission to ±45 degrees cross-poles, the structure of each conversion precoder 74 can be modified by means of a multiplication from the left with a matrix $$\begin{bmatrix} 1 & 1e^{j\phi} \\ 1 & -1e^{j\phi} \end{bmatrix},\quad (11)$$

which, for $\phi=0$, rotates the polarizations 45 degrees to align with horizontal and vertical polarization. Other values of $\phi$ may be used to achieve various forms of circular polarization. Henceforth, it is assumed for purposes of this discussion that such rotations are absorbed into the channel.

For an $N_T$ element ULA, the precoder W for rank 1 is to be a $N_T \times 1$ vector as $$W = w_n^{(N_T,Q)} = \begin{bmatrix} w_{1,n}^{(N_T,Q)} & w_{2,n}^{(N_T,Q)} & \ldots & w_{N_T,n}^{(N_T,Q)} \end{bmatrix}^T. \quad (12)$$

In this context, recall that W is may be formed as the product (matrix multiplication) of a given conversion precoder 74 and a corresponding tuning precoder 76, e.g., $W=W^{(c)}W^{(t)}$. Noting that for antennas $m=0, 1, \ldots, N_T/2-1$, $$w_{m,n}^{(N_T,Q)} = \exp\left(j\frac{2\pi}{N_T Q}mn\right) = \exp\left(j\frac{2\pi}{\frac{N_T}{2}(2Q)}mn\right) = w_{m,n}^{(N_T/2,2Q)}, \quad (13)$$

$$n = 0, \ldots, QN_T - 1,$$

while for the remaining antennas $m=N_T/2+m'$, $m'=0, 1, \ldots, N_T/2-1$, $$w_{N_T/2+m',n}^{(N_T,Q)} = \exp\left(j\frac{2\pi}{N_T Q}(N_T/2 + m')n\right) \quad (14)$$

$$= \exp\left(j\frac{2\pi}{\frac{N_T}{2}(2Q)}m'n\right)\exp\left(j\frac{\pi}{Q}n\right)$$

$$= w_{m',n}^{(N_T/2,2Q)}\exp\left(j\frac{\pi}{Q}n\right)$$

$$= w_{m',n}^{(N_T/2,2Q)}\alpha, n = 0, \ldots, QN_T - 1.$$

Here, $$\alpha \in \left\{\exp\left(j\frac{\pi}{Q}n\right): n = 0, 1, \ldots, 2Q - 1\right\}.$$

Any $N_T$ element DFT precoder can thus be written as $$w_n^{(N_T,Q)} = \begin{bmatrix} w_{0,n}^{(N_T,Q)} & w_{1,n}^{(N_T,Q)} & \ldots & w_{N_T-1,n}^{(N_T,Q)} & w_{0,n}^{(N_T,Q)}\alpha \\ & w_{1,n}^{(N_T,Q)}\alpha & \ldots & w_{N_T-1,n}^{(N_T,Q)} \end{bmatrix}^T \quad (15)$$

$$= \begin{bmatrix} w_n^{(N_T/2,2Q)} \\ w_n^{(N_T/2,2Q)}\alpha \end{bmatrix} = \begin{bmatrix} w_n^{(N_T/2,2Q)} & 0 \\ 0 & w_n^{(N_T/2,2Q)} \end{bmatrix}\begin{bmatrix} 1 \\ \alpha \end{bmatrix}$$

However, this falls under the factorized precoder structure if the tuning precoder codebook contains the precoder elements $$\left\{\begin{bmatrix} 1 \\ \exp\left(j\frac{\pi}{Q}n\right) \end{bmatrix}: n = 0, 1, \ldots, 2Q - 1\right\}, \quad (16)$$

and moreover suits the closely spaced cross-polarized array perfectly because size $N_T/2$ DFT precoders are now applied on each antenna group ULA and the tuning precoder provides 2Q different relative phase shifts between the two orthogonal polarizations. It is also seen how the $N_T/2$ element $w_n^{(N_T/2,2Q)}$ precoders are reused for constructing the $N_T$ element precoder $w_n^{(N_T,Q)}$.

Thus, as an example, the codebook 26 at the transceiver 10 and at the transceiver 12 may be represented as two codebooks 70 and 72, such as shown in FIG. 7. In particular, the codebook 70 contains codebook entries comprising a defined set of conversion precoders 74, while the codebook 72 contains codebook entries comprising a defined set of tuning precoders 76. Pairings of respective conversion and tuning precoders 74 and 76 form corresponding overall precoders 28. That is, the codebook 26 at the transceiver 10 may comprise a set of overall precoders 28, each representing the combination of a selected conversion precoder 74 and a selected tuning precoder 76—e.g., the matrix product of the selected conversion and tuning precoders 74 and 76. As such, it will be understood that the codebook 26 may be structured as a table or other data structure having overall precoders 28 as its entries, or may equivalently be structured or represented by the conversion and tuning precoder codebooks 70 and 72, respectively containing defined sets of conversion and tuning precoders 74 and 76.

In at least one embodiment, the codebook 70 includes a number of DFT based precoders as the conversion precoders 74. These DFT based precoders have an oversampling factor 2Q, which are used together with tuning precoders 76 in the codebook 72, for building overall precoders 28 as DFT based precoders W with an oversampling factor Q for an antenna array with twice as many elements. With this arrangement, the oversampling factor (2Q) is twice as large as for the co-polarized $N_T$-element ULA (Q), but those elements are not wasted because they help to increase the spatial resolution of the grid of beams precoders even further. This characteristic is particularly useful in MU-MIMO applications where good performance relies on the ability to very precisely form beams towards the UE of interest and nulls towards the other co-scheduled UEs.

For example, take a special case of $N_T=8$ transmit antennas—i.e., assume that the transceiver 10 of FIG. 1 includes eight antennas 14, for use in precoded MIMO transmissions, and assume that Q=2 for the closely spaced ULA. One sees that the precoder is built up as $$w_n^{(8,2)} = \begin{bmatrix} w_n^{(N_T/2,2Q)} \\ w_n^{(N_T/2,2Q)}\alpha \end{bmatrix} \quad (17)$$

$$= \begin{bmatrix} w_n^{(4,4)} & 0 \\ 0 & w_n^{(4,4)} \end{bmatrix}$$

$$\begin{bmatrix} 1 \\ \exp\left(j\frac{\pi}{2}n'\right) \end{bmatrix}, n = 0, \ldots, 2N_T - 1, n' = 0, 1, 2, 3.$$

The codebook 72 for the tuning precoders 76 can then be chosen from the rank 1, 2 Tx codebook in LTE and hence that codebook can be re-used. The codebook for the conversion precoders 74 contains elements constructed from four DFT based generator matrices as in Eq. (8). The codebooks 70 and 72 can contain other elements in addition to the DFT based ones. Broadly, this principle of constructing N element DFT precoders out of smaller, N/2 element DFT precoders can thus be used in general to add efficient closely spaced ULA and cross-pole support to a codebook based precoding scheme. Advantageously, this particular precoder structure can be used even if the antenna setups differ from what is being assumed in this example.

Further, note that DFT-based precoders can be used for transmission ranks higher than one, as well. One way to do so is to pick the antenna group precoders 74 (denoted here as $\tilde{W}^{(c)}$) as column subsets of DFT-based generator matrices, such as those shown in Eq. (8).

The tuning precoders 76 can be extended with additional columns as well, to match the desired value of the transmission rank. For transmission rank 2, a tuning precoder 76 can be selected as $$W^{(t)} = \begin{bmatrix} 1 & 1 \\ \alpha & -\alpha \end{bmatrix}, \alpha \in \left\{ \exp\left(j\frac{\pi}{Q}n\right) : n = 0, 1, \ldots, 2Q-1 \right\}. \quad (18)$$

It is sometimes beneficial to re-use existing codebooks in the design of new codebooks. However, one associated problem is that existing codebooks may not contain all the needed DFT precoder vectors to provide at least Q=2 times oversampling of the grid of beams. Assume for example that one has an existing codebook for $N_T/2$ antennas with DFT precoders providing $Q=Q_e$ in oversampling factor and that the target oversampling factor for the $N_T/2$ element antenna group ULA is $Q=Q_t$. The spatial resolution of the existing codebook can then be improved to the target oversampling factor in factorized precoder design as $$w = \begin{bmatrix} \Lambda_{\tilde{q}} w_n^{(N_T/2,Q_e)} & 0 \\ 0 & \Lambda_{\tilde{q}} w_n^{(N_T/2,Q_e)} \end{bmatrix} \begin{bmatrix} 1 \\ \alpha \end{bmatrix}, \quad (19)$$

$$n = 0, \ldots, Q_e N_T - 1, \tilde{q} = 0, 1, \ldots, Q_t/Q_e - 1$$

$$\Lambda_{\tilde{q}} = \text{diag}\left(1, \exp\left(j\frac{2\pi}{\frac{N_T}{2}} \frac{\tilde{q}}{Q_t} 1\right), \exp\left(j\frac{2\pi}{\frac{N_T}{2}} \frac{\tilde{q}}{Q_t} 2\right), \ldots, \exp\left(j\frac{2\pi}{\frac{N_T}{2}} \frac{\tilde{q}}{Q_t} (N_T/2 - 1)\right)\right).$$

Here, the $w_n^{(N_T/2,Q_e)}$ could be elements in the existing LTE 4 Tx House Holder codebook, which contains 8 DFT based precoders (using an oversampling factor of Q=2) for rank 1. When the transmission rank is higher than one, the block diagonal structure can be maintained and the structure thus generalizes to $$W = \begin{bmatrix} \Lambda_{\tilde{q}} W^{(c)} & 0 \\ 0 & \Lambda_{\tilde{q}} W^{(c)} \end{bmatrix} W^{(t)}, \quad (20)$$

where the overall precoder W is now an $N_T \times r$ matrix, the conversion precoder $\tilde{W}^{(c)}$ is a matrix with at least one column equal to a DFT based precoder $w_n^{(T_T/2,Q_e)}$, and the tuning precoder $W^{(t)}$ has r columns.

To see that that the spatial resolution can be improved by multiplying the antenna group precoder with a diagonal matrix as described above, consider the alternative parameterization of DFT precoders in Eq. (7), $$w_{m,Q_t l+q}^{(N_T,Q_t)} = \exp\left(j\frac{2\pi}{N_T}m\left(l + \frac{q}{Q_t}\right)\right), \quad (21)$$

$$m = 0, \ldots, N_T - 1, l = 0, \ldots, N_T - 1, q = 0, \ldots, Q_t - 1,$$

and let $$q = \frac{Q_t}{Q_e} q' + \tilde{q}, q' = 0, \ldots, Q_e - 1, \tilde{q} = 0, \ldots, \frac{Q_t}{Q_e} - 1, \quad (22)$$

to arrive at $$w_{m,Q_t l+\frac{Q_t}{Q_e}q'+\tilde{q}}^{(N_T,Q_t)} = \exp\left(j\frac{2\pi}{N_T}m\left(l + \frac{1}{Q_t}\left(\frac{Q_t}{Q_e}q' + \tilde{q}\right)\right)\right) \quad (23)$$

$$= \left(j\frac{2\pi}{N_T}m\left(l + \frac{q'}{Q_e}\right)\right)\exp\left(j\frac{2\pi}{N_T}m\frac{\tilde{q}}{Q_t}\right)$$

$$= w_{m,Q_e l+q'}^{(N_T,Q_e)} \exp\left(j\frac{2\pi}{N_T}m\frac{\tilde{q}}{Q_t}\right)$$

for $$m = 0, \ldots, N_T - 1, l = 0, \ldots, N_T - 1,$$

$$q' = 0, \ldots, Q_e - 1, \tilde{q} = 0, \ldots, \frac{Q_t}{Q_e} - 1.$$

The above formulations demonstrate an advantageous aspect of the teachings presented herein. Namely, a codebook containing DFT precoders with oversampling factor $Q_e$ can be used for creating a higher resolution DFT codebook by multiplying the m:th antenna element with exp $$\left(j\frac{2\pi}{N_T}m\frac{\tilde{q}}{Q_t}\right)$$

and hence proving that the diagonal transformation given by $\Lambda_{\tilde{q}}$ indeed works as intended. It is also conceivable that such a structure where the antenna group precoder is multiplied with a diagonal matrix in general (i.e., even when the codebooks are not using DFT based vectors) can improve the performance.

As for the desirable properties of full PA utilization and rank nested property, a first step in designing efficient factorized precoder codebooks while achieving full PA utilization and fulfilling the rank nested property is to make the conversion precoders 74 block diagonal as in Eq. (4). In a particular case, the number of columns k of a conversion precoder 74 is made equal to $2\lceil r/2 \rceil$, where $\lceil \cdot \rceil$ denotes the ceil function. This structure is achieved by adding two new columns contributing equally much to each polarization for every other rank. In other words, such a conversion precoder 74 can be written in the form $$W^{(c)} = \begin{bmatrix} \tilde{W}^{(c)} & 0 \\ 0 & \tilde{W}^{(c)} \end{bmatrix} \quad (24)$$

$$= \begin{bmatrix} \tilde{w}_1^{(c)} & \tilde{w}_2^{(c)} & \ldots & \tilde{w}_{\lceil r/2 \rceil}^{(c)} & 0 & 0 & \ldots & 0 \\ 0 & 0 & \ldots & 0 & \tilde{w}_1^{(c)} & \tilde{w}_2^{(c)} & \ldots & \tilde{w}_{\lceil r/2 \rceil}^{(c)} \end{bmatrix},$$

where $\tilde{w}_i^{(c)}$ is an $N_T/2 \times 1$ vector.

Extending the conversion dimension in this manner helps in keeping the number of dimensions small and in addition serves to make sure that both polarizations are excited equally much. It is beneficial if the conversion precoder 74, $\tilde{W}(c)$, is also made to obey a generalized rank nested property in that there is freedom to choose $\tilde{W}^{(c)}$ with L columns as an arbitrary column subset of each possible $\tilde{W}^{(c)}$ with L+1 columns. An alternative is to have the possibility to signal the column ordering used in $\tilde{W}^{(c)}$. Flexibility in the choice of columns for $\tilde{W}^{(c)}$ for the different ranks is beneficial so as to still be able to transmit into the strongest subspace of the channel even when rank override using a column subset is performed.

To ensure full PA utilization at the transceiver 10 in one or more embodiments, one or more subsets 88 of the tuning precoders 76 are constructed as follows: (a) the conversion vector $\tilde{w}_n^{(c)}$ is made constant modulus; and (b) a column in the tuning precoder 76 has exactly two non-zero elements with constant modulus. If the m:th element is non-zero, so is element m+⌈r/2⌉. Hence for rank r=4, the columns in an example tuning precoder 76 are of the following form $$\begin{bmatrix} x \\ 0 \\ x \\ 0 \end{bmatrix}, \begin{bmatrix} 0 \\ x \\ 0 \\ x \end{bmatrix}, \quad (25)$$

where x denotes an arbitrary non-zero value which is not necessarily the same from one x to another. Because there are two non-zero elements in a column, two orthogonal columns with the same positions of the non-zero elements can be added before columns with other non-zero positions are considered. Such pair-wise orthogonal columns with constant modulus property can be parameterized as $$\begin{bmatrix} 1 \\ 0 \\ e^{j\phi} \\ 0 \end{bmatrix}, \begin{bmatrix} 1 \\ 0 \\ -e^{j\phi} \\ 0 \end{bmatrix}. \quad (26)$$

Rank nested property for the overall precoder is upheld when increasing the rank by one by ensuring that columns for previous ranks excite the same columns of the conversion precoder also for the higher rank. Combining this with Eq. (25) and the mentioned pair-wise orthogonal property of the columns leads to a double block diagonal structure of the tuning precoder 76 taking the form $$W = \begin{bmatrix} \tilde{w}_1^{(c)} & \tilde{w}_2^{(c)} & \ldots & \tilde{w}_{\lceil r/2 \rceil}^{(c)} & 0 & 0 & \ldots & 0 \\ 0 & 0 & \ldots & 0 & \tilde{w}_1^{(c)} & \tilde{w}_2^{(c)} & \ldots & \tilde{w}_{\lceil r/2 \rceil}^{(c)} \end{bmatrix} \quad (27)$$

$$\begin{bmatrix} x & x & 0 & 0 & \ldots \\ 0 & 0 & x & x & \\ \vdots & & & & \ddots \\ x & x & 0 & 0 & \ldots \\ 0 & 0 & x & x & \\ \vdots & & & & \ddots \end{bmatrix}.$$

Using the pair-wise orthogonality property in Eq. (26), and representing the precoder structure W as $W^{(c)}W^{(t)}$, the precoder structure can be further specialized into $$W = \begin{bmatrix} \tilde{w}_1^{(c)} & \tilde{w}_2^{(c)} & \ldots & \tilde{w}_{\lceil r/2 \rceil}^{(c)} & 0 & 0 & \ldots & 0 \\ 0 & 0 & \ldots & 0 & \tilde{w}_1^{(c)} & \tilde{w}_2^{(c)} & \ldots & \tilde{w}_{\lceil r/2 \rceil}^{(c)} \end{bmatrix} \quad (28)$$

$$\begin{bmatrix} 1 & 1 & 0 & 0 & \ldots \\ 0 & 0 & 1 & 1 & \\ \vdots & & & & \ddots \\ e^{j\phi_1} & -e^{j\phi_1} & 0 & 0 & \ldots \\ 0 & 0 & e^{j\phi_2} & -e^{j\phi_2} & \\ \vdots & & & & \ddots \end{bmatrix}.$$

Note that the double block diagonal structure for the tuning precoder 76 can be described in different ways depending on the ordering of the columns in the conversion precoder 76. It is possible to equivalently make the tuning precoder 76 block-diagonal by writing $$W = \begin{bmatrix} \tilde{w}_1^{(c)} & 0 & \tilde{w}_2^{(c)} & 0 & \ldots & \ldots & \tilde{w}_{\lceil r/2 \rceil}^{(c)} & 0 \\ 0 & \tilde{w}_1^{(c)} & 0 & \tilde{w}_2^{(c)} & \ldots & \ldots & 0 & \tilde{w}_{\lceil r/2 \rceil}^{(c)} \end{bmatrix} \quad (29)$$

$$\begin{bmatrix} x & x & 0 & 0 & \ldots & & 0 & 0 \\ x & x & 0 & 0 & & & & \vdots \\ 0 & 0 & x & x & \ddots & & & \\ \vdots & & x & x & & & & \\ & & 0 & 0 & \ddots & & & \\ \vdots & & & & & & 0 & 0 \\ & & & & & \ddots & x & x \\ 0 & 0 & 0 & 0 & \ldots & 0 & x & x \end{bmatrix}.$$

Re-orderings similar to these do not affect the overall precoder W and are thus to be considered equivalents falling with the meaning of the terms "block diagonal conversion precoder" and "double block diagonal tuning precoder," as used herein. It is also interesting to note that if the requirements on the orthogonality constraint and full PA utilization are relaxed, the design for rank nested property can be summarized with the following structure for the tuning precoders 76

$$\begin{bmatrix} x & x & x & x & x \\ 0 & 0 & x & x & x \\ \vdots & & & x & x & \ddots \\ x & x & x & x & x \\ 0 & 0 & x & x & x \\ \vdots & & & x & x & \ddots \end{bmatrix}. \quad (30)$$

Finally, it is worth mentioning that rank nested property can be useful when applied separately to the conversion precoders 74 and the tuning precoders 76. Even applying it only to the tuning precoders 76 can help save computational complexity, because precoder calculations across ranks can be re-used as long as the conversion precoder 76 remains fixed.

As an illustrative example for eight transmit antennas 14 at the transceiver 10, assume that Rank r=1

$$W = \begin{bmatrix} w_1^{(1)} & \\ & w_1^{(1)} \end{bmatrix} \begin{bmatrix} 1 \\ e^{j\varphi_k} \end{bmatrix} \quad (31)$$

Rank $r = 2$ $$W = \begin{bmatrix} w_1^{(1)} & \\ & w_1^{(1)} \end{bmatrix} \begin{bmatrix} 1 & 1 \\ e^{j\varphi_k} & -e^{j\varphi_k} \end{bmatrix} \quad (32)$$

Rank $r = 3$ $$W = \begin{bmatrix} w_1^{(1)} & w_2^{(1)} & & \\ & & w_1^{(1)} & w_2^{(1)} \end{bmatrix} \begin{bmatrix} 1 & 1 & 0 \\ 0 & 0 & 1 \\ e^{j\varphi_k} & e^{j\varphi_k} & 0 \\ 0 & 0 & e^{j\varphi_l} \end{bmatrix} \quad (33)$$

Rank $r = 4$ $$W = \begin{bmatrix} w_1^{(1)} & w_2^{(1)} & & \\ & & w_1^{(1)} & w_2^{(1)} \end{bmatrix} \begin{bmatrix} 1 & 1 & 0 & 0 \\ 0 & 0 & 1 & 1 \\ e^{j\varphi_k} & -e^{j\varphi_k} & 0 & 0 \\ 0 & 0 & e^{j\varphi_l} & -e^{j\varphi_l} \end{bmatrix} \quad (34)$$

Rank $r = 5$ $$W = \begin{bmatrix} w_1^{(1)} & w_2^{(1)} & w_3^{(1)} & & & \\ & & & w_1^{(1)} & w_2^{(1)} & w_3^{(1)} \end{bmatrix} \quad (35)$$

$$\begin{bmatrix} 1 & 1 & 0 & 0 & 0 \\ 0 & 0 & 1 & 1 & 0 \\ 0 & 0 & 0 & 0 & 1 \\ e^{j\varphi_k} & -e^{j\varphi_k} & 0 & 0 & 0 \\ 0 & 0 & e^{j\varphi_l} & -e^{j\varphi_l} & 0 \\ 0 & 0 & 0 & 0 & e^{j\varphi_m} \end{bmatrix}$$

Rank $r = 6$ $$W = \begin{bmatrix} w_1^{(1)} & w_2^{(1)} & w_3^{(1)} & & & \\ & & & w_1^{(1)} & w_2^{(1)} & w_3^{(1)} \end{bmatrix} \quad (36)$$

$$\begin{bmatrix} 1 & 1 & 0 & 0 & 0 & 0 \\ 0 & 0 & 1 & 1 & 0 & 0 \\ 0 & 0 & 0 & 0 & 1 & 1 \\ e^{j\varphi_k} & -e^{j\varphi_k} & 0 & 0 & 0 & 0 \\ 0 & 0 & e^{j\varphi_l} & -e^{j\varphi_l} & 0 & 0 \\ 0 & 0 & 0 & 0 & e^{j\varphi_m} & -e^{j\varphi_m} \end{bmatrix}$$

Rank $r = 7$ $$W = \begin{bmatrix} w_1^{(1)} & w_2^{(1)} & w_3^{(1)} & w_4^{(1)} & & & & \\ & & & & w_1^{(1)} & w_2^{(1)} & w_3^{(1)} & w_4^{(1)} \end{bmatrix} \quad (37)$$

$$\begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 0 & 0 & 0 & 0 & 0 & 0 & 1 \\ e^{j\varphi_k} & -e^{j\varphi_k} & 0 & 0 & 0 & 0 & 0 \\ 0 & 0 & e^{j\varphi_l} & -e^{j\varphi_l} & 0 & 0 & 0 \\ 0 & 0 & 0 & 0 & e^{j\varphi_m} & -e^{j\varphi_m} & 0 \\ 0 & 0 & 0 & 0 & 0 & 0 & e^{j\varphi_n} \end{bmatrix}$$

Rank $r = 8$ $$W = \begin{bmatrix} w_1^{(1)} & w_2^{(1)} & w_3^{(1)} & w_4^{(1)} & & & & \\ & & & & w_1^{(1)} & w_2^{(1)} & w_3^{(1)} & w_4^{(1)} \end{bmatrix} \quad (38)$$

$$\begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ e^{j\varphi_k} & -e^{j\varphi_k} & 0 & 0 & 0 & 0 & 0 & 0 \\ 0 & 0 & e^{j\varphi_l} & -e^{j\varphi_l} & 0 & 0 & 0 & 0 \\ 0 & 0 & 0 & 0 & e^{j\varphi_m} & -e^{j\varphi_m} & 0 & 0 \\ 0 & 0 & 0 & 0 & 0 & 0 & e^{j\varphi_n} & -e^{j\varphi_n} \end{bmatrix}$$

The 4 Tx case follows in a similar manner.

Another aspect of the teachings herein relates to the use of sub-sampling of precoder codebook(s) for reducing the payload needed for precoder selection feedback reporting. To illustrate how sub-sampling of precoder codebooks can be performed for reducing the payload size of the Channel State Information (CSI) reporting, consider the factorized precoder design discussed repeatedly herein. Namely, consider the case where an overall precoder W is represented by two precoders, each being one of two factors used to represent W in factorized form. This approach was seen earlier, with the use of a conversion precoder 74 denoted as $W^{(c)}$, and a tuning precoder 76 denoted as $W^{(t)}$. Thus, one has $$W = \begin{bmatrix} \tilde{W}^{(c)} & 0 \\ 0 & \tilde{W}^{(c)} \end{bmatrix} W^{(t)}. \quad (39)$$

If the codebook for the antenna group precoder $\tilde{W}^{(c)}$ contains a set of DFT based precoders, then these precoders can be sub-sampled by lowering the oversampling factor. This example of sub-sampling results in only being able to use every K:th beam in the grid of beams. Sub-sampling of the codebook can also be performed by selecting the M precoders out of N precoders in the codebook, which maximizes the minimum distance between the selected precoders on the Grassmanian manifold. Distances here can be measured, for example, as Chordal distance, projection two-norm distance, or Fubini-Study distance.

Sub-sampling principles as described above can also be applied to the tuning precoders 76 or to any precoder design. The sub-sampled codebooks can then be used on lower payload capable channels, e.g., PUCCH in LTE, while the full codebooks are used on the more capable ones, e.g., PUSCH in LTE. This approach can be understood as using sub-sampling to provide "coarse" CSI reporting on the PUCCH, while providing richer, higher-resolution CSI reporting on the PUSCH. For example, the use of codebook subset restrictions allows an LTE eNodeB to configure a UE to only use a subset of precoders in a codebook, for computing and reporting CSI feedback (including the precoder selection feedback 44).

Further, some of the useful constraints on precoder selection by a UE or other targeted transceiver, such as precoders satisfying full PA utilization and rank nested property, might be too restrictive when it comes to MU-MIMO operation, for example. This is because MU-MIMO operation requires more freedom in the precoder design for increased spatial resolution and resulting improved UE separation. Thus, one aspect of the teachings herein is to reduce the signaling overhead for signaling precoder restrictions by pre-defining one or more precoder subsets, with one subset designated for MU-MIMO and the other subset designated for SU-MIMO. Signaling those subsets requires much less overhead since the individual precoders in each subset no longer need to be explicitly signaled. Indeed, a single-bit flag can be used to indicate which one of the two subsets is to be considered by the UE as "currently permitted."

In more detail, one of the predefined subsets 50 of overall precoders 28 within the codebook 26 can be all overall precoders 28 that satisfy the full PA utilization and rank nested property criteria. This subset would specifically target SU-MIMO operation. Another subset 50 in the codebook 26 could correspond to some or all of the overall precoders 28 in the codebook 26, including those that violate full PA utilization and rank nested property. This latter subset 50 could be used for MU-MIMO, both SU-MIMO and MU-MIMO. Moreover, the precoder subsets can be specified across all ranks, or alternatively, precoder subsets together with rank subsets can be signaled, for greater control from the network side.

When the overall precoders 28 in the codebook 26 are represented as defined sets 80 and 86 of conversion and tuning precoders 74 and 76, subsets and subset restrictions may be defined separately for the conversion precoders 74 and the tuning precoders 76. Or, subset restrictions may be applied just to the conversion precoders 74, or just to the tuning precoders 76. In particular, it can be useful to apply codebook subset restrictions only to the conversion precoders 74. This is so because the conversion precoders 74 are the ones primarily affected by the MIMO mode in use (SU-MIMO or MU-MIMO).

Of course, the teachings herein are not limited to the specific, foregoing examples and accompanying illustrations. For example, terminology from 3GPP LTE was used in this disclosure to provide a relevant and advantageous context for understanding operations at the transceivers 10 and 12, which were identified in one or more embodiments as being an LTE eNodeB and an LTE UE, respectively. However, the use of parameterized codebooks 26 may be used in other wireless systems, including but not limited to WCDMA, WiMax, UMB and GSM.

Further, the transceiver 10 and the transceiver 12 are not necessarily a base station and an item of mobile equipment within a standard cellular network, although the teachings herein have advantages in such a context. Moreover, while the particular wireless network examples given herein involve the "downlink" from an eNodeB or other network base station, the teachings presented herein also have applicability to the uplink. More broadly, it will be understood that the teachings herein are limited by the claims and their legal equivalents, rather than by the illustrative examples given herein.

What is claimed is:

1. A method in a first wireless communication transceiver of generating precoder selection feedback to a second wireless communication transceiver that precodes transmissions to the first wireless communication transceiver, wherein said precoder selection feedback indicates precoder selection by said first wireless communication transceiver, wherein a defined set of overall precoders is represented by defined sets of conversion precoders and tuning precoders such that each overall precoder in the defined set of overall precoders comprises a combination of a conversion precoder from a defined set of conversion precoders and a tuning precoder from a defined set of tuning precoders, said method comprising:

receiving restriction signaling from the second wireless communication transceiver that indicates at least one of a permitted subset of conversion precoders of said defined set of conversion precoders, and a permitted subset of tuning precoders of said defined set of tuning precoders; and generating said precoder selection feedback for sending to the second wireless communication transceiver based on restricting precoder selections by said first wireless communication transceiver according to said restriction signaling.

2. The method of claim 1, wherein said precoder selection feedback comprises indications of a selected conversion precoder as selected by said first wireless communication transceiver from said permitted subset of conversion precoders in said conversion precoder codebook, and a selected tuning precoder as selected by said first wireless communication transceiver from said permitted subset of tuning precoders in said tuning precoder codebook.

3. The method of claim 1, wherein said precoder selection feedback comprises index values identifying codebook entries within said conversion and tuning precoder codebooks, as selected by said first wireless communication transceiver.

4. The method of claim 1, further comprising at least one of:

two or more predefined subsets of conversion precoders and two or more predefined subsets of tuning precoders; and wherein said restriction signaling indicates at least one of: the permitted subset of conversion precoders among said two or more predefined subsets of conversion precoders, and the permitted subset of tuning precoders among said two or more predefined subsets of tuning precoders.

5. The method of claim 4, wherein at least one of the predefined subsets contains only precoders such that corresponding overall precoders fulfill a full PA utilization property, while at least one other one of the predefined subsets contains precoders such that corresponding overall precoders do not fulfill the full PA utilization property;

wherein the rows of an overall precoder matrix obeying the full PA utilization property all have the same $l^2$-norm, where $l^2$-norm of a row x with elements $x_k$ is defined as $$\sqrt{\sum_k |x_k|^2}.$$

6. The method of claim 4, wherein one or more of the predefined subsets are associated with a first operating mode of said first wireless communication transceiver or said second wireless communication transceiver, while one or more other ones of the predefined subsets are associated with a second operating mode of said first wireless communication transceiver or said second wireless communication transceiver, and wherein said restriction signaling identifies the one or more permitted subsets of precoders by indicating which operating mode applies.

7. The method of claim 1, wherein said defined set of conversion precoders or said defined set of tuning precoders are divided into one or more first subsets of precoders associated with Single-User Multiple-Input-Multiple-Output, SU-MIMO, operation of the second wireless communication transceiver and one or more second subsets of precoders associated with Multiple-User MIMO, MU-MIMO, operation of the second wireless communication transceiver, and wherein said restriction signaling identifies the one or more permitted subsets of precoders by indicating whether SU-MIMO or MU-MIMO operation applies.

8. The method of claim 1, wherein said defined set of conversion precoders includes $N_T Q$ different conversion precoders and said defined set of tuning precoders includes a number of corresponding tuning precoders, and wherein each said conversion precoder comprises a block diagonal matrix in which each block comprises a DFT-based precoder that defines $N_T Q$ different DFT based beams for a subgroup in a group of $N_T$ transmit antenna ports at the second wireless communication transceiver, where Q is an integer value and where the $N_T Q$ different conversion precoders, together with one or more of the tuning precoders, correspond to a set of $N_T Q$ different overall precoders, each overall precoder thus representing a size-$N_T$ DFT-based beam over the group of $N_T$ transmit antennas ports.

9. The method of claim 1, wherein the second wireless communication transceiver comprises a base station in a wireless communication network and said first wireless communication transceiver comprises a user equipment, and wherein the method further comprises receiving said restriction signaling at least in part as Radio Resource Control (RRC) layer signaling.

10. A first wireless communication transceiver configured to control precoder selection feedback sent to a second wireless communication transceiver that precodes transmissions to the first wireless communication transceiver, wherein said precoder selection feedback indicates precoder selections by said first wireless communication transceiver, wherein a defined set of overall precoders is represented by defined sets of conversion precoders and tuning precoders such that each overall precoder in the defined set of overall precoders comprises a combination of a conversion precoder from a defined set of conversion precoders and a tuning precoder from a defined set of tuning precoders, said first wireless communication transceiver comprising:
a receiver configured to receive restriction signaling from the second wireless communication transceiver that indicates at least one of a permitted subset of conversion precoders within the defined set of said conversion precoders, and a permitted subset of tuning precoders in said defined set of tuning precoders; and
a precoding feedback generator configured to generate said precoder selection feedback for sending to the second wireless transceiver, based on restricting precoder selections by said first wireless communication transceiver according to the restriction signaling.

11. The first wireless communication transceiver of claim 10, wherein said precoder selection feedback comprises indications of a selected conversion precoder as selected by said first wireless communication transceiver from said permitted subset of conversion precoders in said conversion precoder codebook, and a selected tuning precoder as selected by said first wireless communication transceiver from said permitted subset of tuning precoders in said tuning precoder codebook.

12. The first wireless communication transceiver of claim 10, wherein said precoding feedback generator is configured to generate the precoder selection feedback as index values identifying codebook entries within said conversion and tuning precoder codebooks, as selected by said first wireless communication transceiver.

13. The first wireless communication transceiver of claim 10, further comprising at least one of:
said first wireless communication transceiver storing two or more representations of predefined subsets of conversion precoders and two or more representations of predefined subsets of tuning precoders; and
wherein said restriction signaling indicates at least one of: the permitted subset of conversion precoders among said two or more predefined subsets of conversion precoders, and the permitted subset of tuning precoders among said two or more predefined subsets of tuning precoders.

14. The first wireless communication transceiver of claim 13, wherein at least one of the predefined subsets contains only precoders such that corresponding overall precoders fulfill a full PA utilization property for the second wireless communication transceiver, while at least one other one of the predefined subsets contains precoders such that corresponding overall precoders do not fulfill the full PA utilization property;
wherein the rows of an overall precoder matrix obeying the full PA utilization property all have the same $l^2$-norm, where $l^2$-norm of a row x with elements $x_k$ is defined as $$\sqrt{\sum_k |x_k|^2}.$$

15. The first wireless communication transceiver of claim 13, wherein one or more of said predefined subsets are associated with a first operating mode of said first wireless communication transceiver or the second wireless communication transceiver, while one or more other ones of the predefined subsets are associated with a second operating mode of said first wireless communication transceiver or the second wireless communication transceiver, and wherein said restriction signaling identifies the one or more permitted subsets of precoders by indicating which operating mode applies.

16. The first wireless communication transceiver of claim 10, wherein said defined set of conversion precoders or said defined set of tuning precoders are divided into one or more first subsets of precoders associated with Single-User Multiple-Input-Multiple-Output, SU-MIMO, operation of the second wireless communication transceiver and one or more second subsets of precoders associated with Multiple-User MIMO, MU-MIMO, operation of the second wireless communication transceiver, and wherein said restriction signaling identifies the one or more permitted subsets of precoders by indicating whether SU-MIMO or MU-MIMO operation applies.

17. The first wireless communication transceiver of claim 10, wherein said defined set of conversion precoders includes $N_T Q$ different conversion precoders and said defined set of tuning precoders includes a number of corresponding tuning precoders, and wherein each said conversion precoder comprises a block diagonal matrix in which each block comprises a DFT-based precoder that defines $N_T \cdot Q$ different DFT based beams for a subgroup in a group of $N_T$ transmit antenna ports at the second wireless communication transceiver, where Q is an integer value and where the $N_T \cdot Q$ different conversion precoders, together with one or more of the tuning precoders, correspond to a set of $N_T \cdot Q$ different overall precoders, each overall precoder thus representing a size—$N_T$ DFT-based beam over the group of $N_T$ transmit antennas ports.

18. The first wireless communication transceiver of claim 10, wherein the second wireless communication transceiver comprises a base station in a wireless communication network and said first wireless communication transceiver comprises a user equipment, and wherein said first wireless communication transceiver is configured to receive said restriction signaling at least in part as Radio Resource Control (RRC) layer signaling.

19. A second wireless communication transceiver configured to precode transmissions to a first wireless communication transceiver based at least in part on receiving precoder selection feedback from the first wireless communication transceiver that indicates a precoder selection for consideration by said second wireless communication transceiver in precoding transmissions to the first wireless communication transceiver, wherein a defined set of overall precoders is represented by defined sets of conversion precoders and tuning precoders such that each overall precoder in the defined set comprises a combination of a conversion precoder from said defined set of conversion precoders and a tuning precoder from said defined set of tuning precoders, said second wireless communication transceiver comprising:
 a receiver for receiving said precoder selection feedback from the first wireless communication transceiver;
 a precoding controller configured to determine a restriction that limits precoder selection by the first wireless communication transceiver to at least one of a permitted subset of conversion precoders in said defined set of conversion precoders and a permitted subset of tuning precoders in said defined set of tuning precoders; and
 a transmitter cooperatively associated with said precoding controller and configured for transmitting said restriction signaling to the other transceiver.

20. The second wireless communication transceiver of claim 19, wherein said first wireless communication transceiver stores a representation of a conversion precoder codebook containing said defined set of conversion precoders and a representation of a tuning precoder codebook containing said defined set of tuning precoders, and wherein the second wireless communication transceiver is further configured to generate the restriction signaling to indicate at least one of:
 a permitted subset of conversion precoders in said conversion precoder codebook; and
 a permitted subset of tuning precoders in said tuning precoder codebook.

21. The second wireless communication transceiver of claim 19, wherein said precoder selection feedback comprises indications of a selected conversion precoder as selected by said first wireless communication transceiver from said permitted subset of conversion precoders in said conversion precoder codebook, and a selected tuning precoder as selected by said first wireless communication transceiver from said permitted subset of tuning precoders in said tuning precoder codebook, and wherein said second wireless communication transceiver is configured to determine the overall precoder from the defined set of overall precoders corresponding to said indications in said precoder selection feedback.

22. The second wireless communication transceiver of claim 19, wherein the transceiver maintains a codebook representation of said defined set of overall precoders and uses indications of selected conversion and tuning precoders conveyed by said precoder selection feedback to identify the overall precoder selected by the first wireless communication transceiver.

23. The second wireless communication transceiver of claim 19, wherein said restriction signaling comprises a mode indicator that identifies one of a first and a second transmission mode, and wherein said precoding controller sets the mode indicator in dependence on whether the second wireless communication transceiver is operating in the first or the second transmission mode, and wherein one or more subsets among said defined sets of conversion precoders and tuning precoders at the first wireless communication transceiver are permitted for said first transmission mode, and one or more other ones of the subsets among said defined sets of conversion precoders and tuning precoders at said first wireless communication transceiver are permitted for said second transmission mode.

24. The second wireless communication transceiver of claim 19, wherein said second wireless communication transceiver comprises a base station in a wireless communication network.

25. A method in a second wireless communication transceiver that is configured to precode transmissions to a first wireless communication transceiver based at least in part on receiving precoder selection feedback from said first wireless communication transceiver that indicates a precoder selection for consideration by said second wireless communication transceiver in precoding transmissions to the first wireless communication transceiver, wherein a defined set of overall precoders is represented by defined sets of conversion precoders and tuning precoders such that each overall precoder in the defined set comprises a combination of a conversion precoder from said defined set of conversion precoders and a tuning precoder from said defined set of tuning precoders, said method comprising:
 determining a restriction that limits precoder selection by the first wireless communication transceiver to at least one of at least one of a permitted subset of conversion precoders in said defined set of conversion precoders and a permitted subset of tuning precoders in said defined set of tuning precoders;
 generating restriction signaling for indicating the one or more permitted subsets to said first wireless communication transceiver; and
 sending the restriction signaling to the first wireless communication transceiver, to restrict precoder selection by the first wireless communication transceiver to the one or more permitted subsets.

26. The method of claim 25, wherein said precoder selection feedback comprises indications of a selected conversion precoder as selected by said first wireless communication transceiver from said permitted subset of conversion precoders in said conversion precoder codebook, and a selected tuning precoder as selected by said first wireless communication transceiver from said permitted subset of tuning precoders in said tuning precoder codebook, and said second wireless communication transceiver determining the overall precoder from the defined set of overall precoders corresponding to said indications in said precoder selection feedback.

27. The method of claim 25, wherein said second wireless communication transceiver maintains a codebook representation of the defined set of overall precoders and said method further comprises using indications of selected conversion and tuning precoders conveyed by said precoder selection feedback to identify the overall precoder selected by the first wireless communication transceiver.

28. The method of claim 25, wherein said restriction signaling comprises a mode indicator that identifies one of a first and a second transmission mode, and wherein said method further comprises setting the mode indicator in dependence on whether the transceiver is operating in the first or the second transmission mode, and wherein one or more subsets among said defined sets of conversion precoders and tuning precoders at the first wireless communication transceiver are permitted for said first transmission mode, and one or more other ones of the subsets among said defined sets of conversion precoders and tuning precoders at the first wireless communication transceiver are permitted for said second transmission mode.

29. The method of claim 25, wherein said second wireless communication transceiver comprises a base station in a wireless communication network.

* * * * *

UNITED STATES PATENT AND TRADEMARK OFFICE
CERTIFICATE OF CORRECTION

PATENT NO.        : 8,687,678 B2                                  Page 1 of 1
APPLICATION NO.   : 13/903442
DATED             : April 1, 2014
INVENTOR(S)       : Hammarwall et al.

It is certified that error appears in the above-identified patent and that said Letters Patent is hereby corrected as shown below:

In the Drawings

In Fig. 7, Sheet 3 of 6, delete "TUNING PRECODERS 74" and insert -- TUNING PRECODERS 76 --, therefor.

In Fig. 7, Sheet 3 of 6, delete "CONVERSION PRECODERS 76" and insert -- CONVERSION PRECODERS 74 --, therefor.

In the Specification

In Column 17, Line 44, delete "base station 106," and insert -- base station 104, --, therefor.

In Column 24, Line 30, delete "conversion precoder 76." and insert -- conversion precoder 74. --, therefor.

In Column 25, Line 6, delete "conversion precoder 76" and insert -- conversion precoder 74 --, therefor.

Signed and Sealed this
Thirty-first Day of March, 2015

Michelle K. Lee
*Director of the United States Patent and Trademark Office*